(12) United States Patent
Anisimovich et al.

(10) Patent No.: US 11,379,656 B2
(45) Date of Patent: Jul. 5, 2022

(54) SYSTEM AND METHOD OF AUTOMATIC TEMPLATE GENERATION

(71) Applicant: ABBYY Development Inc., Dover, DE (US)

(72) Inventors: Konstantin Anisimovich, Moscow (RU); Ruslan Garashchuk, Moscow (RU); Stepan Matskevich, Moscow (RU)

(73) Assignee: ABBYY Development Inc., Raleigh, NC (US)

( * ) Notice: Subject to any disclaimer, the term of this patent is extended or adjusted under 35 U.S.C. 154(b) by 179 days.

(21) Appl. No.: 16/172,687

(22) Filed: Oct. 26, 2018

(65) Prior Publication Data

US 2020/0104354 A1 Apr. 2, 2020

(30) Foreign Application Priority Data

Oct. 1, 2018 (RU) .......................... RU2018134347

(51) Int. Cl.
*G06F 40/186* (2020.01)
*G06F 40/131* (2020.01)
(Continued)

(52) U.S. Cl.
CPC .......... *G06F 40/186* (2020.01); *G06F 40/131* (2020.01); *G06F 40/284* (2020.01); *G06F 40/295* (2020.01)

(58) Field of Classification Search
CPC ...... G06F 40/30; G06F 40/211; G06F 40/268; G06F 40/284; G06F 40/295; G06F 40/45;
(Continued)

(56) References Cited

U.S. PATENT DOCUMENTS 8,060,357 B2 * 11/2011 Segond ................. G06F 40/211
704/1
8,965,831 B2 2/2015 Kaledhonkar et al.
(Continued)

FOREIGN PATENT DOCUMENTS

RU 2607976 C1 1/2017
RU 2610241 C2 2/2017
RU 2646386 C1 3/2018

*Primary Examiner* — Yogeshkumar Patel
(74) *Attorney, Agent, or Firm* — Lowenstein Sandler LLP

(57) ABSTRACT

Systems and methods for automatic generation of templates for information extraction rules to extract information objects from natural language texts. An example method of automatic generation of templates for information extraction comprises receiving, by a computer device, a first text fragment, comprising a first identifier of a first text token, wherein the first token comprises one or more words in a natural language and wherein the first token references a first information object from a first category of information objects; displaying, using a template-generating graphical user interface, a plurality of linguistic characteristics of the first token; receiving, via the template-generating graphical user interface, a first input identifying template attributes from the plurality of the linguistic characteristics of the first information object; generating a first template based at least in part on the identified template attributes; creating a first production rule for the first template; applying the first production rule to portions of a first natural language text matching the first template; displaying, using the template-generating graphical user interface, a second information object identified in the first natural language text using the first production rule.

15 Claims, 17 Drawing Sheets

(51) Int. Cl.
*G06F 40/284* (2020.01)
*G06F 40/295* (2020.01)

(58) Field of Classification Search
CPC ...... G06F 40/226; G06F 40/131; G06F 40/14;
G06F 40/186; G06F 40/216; G06F
40/247; G06F 40/35; G06F 40/40; G06F
40/55; G06F 40/58; G06F 16/35; G06F
16/353; G06F 16/36; G06F 16/24535;
G06F 16/2457; G06F 16/24573; G06F
16/284; G06F 16/288; G06F 16/31; G06F
16/332; G06F 16/3329; G06F 16/3334;
G06F 16/3344; G06F 16/367; G06F
16/374; G06F 16/9024; G06F 3/0481;
G06F 3/04847; G06F 9/454; G06F 40/20;
G06F 40/10; G06F 40/253; G06F 40/237;
G06F 40/221; G06F 40/169; G06F
17/278; G06F 17/30684; G06F 17/2785;
G06K 2209/01; G06K 9/00463; G06K
9/00483; G10L 15/18; G10L 15/1815;
G06N 5/02; G06N 5/025

USPC .... 704/9, 2, 3, 4, 8, E15.018, 1, 10, 5, 6, 7;
707/E17.01, E17.015, 706, 736, 755, 769,
707/999.001, 999.005
See application file for complete search history.

(56) References Cited

U.S. PATENT DOCUMENTS

| | | | |
|---|---|---|---|
| 2005/0022207 A1 | 1/2005 | Grabamik et al. | |
| 2007/0179776 A1* | 8/2007 | Segond | G06F 16/332 |
| | | | 704/9 |
| 2016/0147736 A1* | 5/2016 | Danielyan | G06F 40/30 |
| | | | 704/9 |
| 2016/0275058 A1* | 9/2016 | Starostin | G06F 16/313 |
| 2017/0337181 A1* | 11/2017 | Belov | G06F 40/211 |
| 2017/0364503 A1* | 12/2017 | Anisimovich | G06F 40/211 |
| 2018/0060306 A1* | 3/2018 | Starostin | G06F 40/284 |
| 2018/0181559 A1* | 6/2018 | Matskevich | G06F 40/211 |
| 2018/0267958 A1* | 9/2018 | Danielyan | G06F 40/284 |
| 2019/0073593 A1* | 3/2019 | Luo | G06N 3/088 |

* cited by examiner

```
// Extracting objects of ADMINISTRATIVE_AND_TERRITORIAL_UNIT class from Wikipedia namespace WikiAdministrativeUnit;
namespace Basic;

Predicate: "BE" <$ distance:0, includeThisSentence, template:
"DECLARATIVE_MAIN_CLAUSE" <%Preprocessing:FirstSentence%> $>
[Relation_Relative: !Name, Relation_Correlative: !Type
    ( "ADMINISTRATIVE_AND_TERRITORIAL_UNIT" | "AREA" | "VICINITY" ) ~"COUNTRY_BY_NAME"
]
    => AdministrativeUnit U ( this ), StringHolder nameHolder( Name ),
    annotation( nameHolder, Name.core ),
    nameHolder.stringValue == Norm( Name.core ),
    AnnotatedValue( U.WikiAdministrativeUnit:Name, nameHolder, nameHolder.stringValue
), StringHolder typeHolder( Type ),
    annotation( typeHolder, Type.core ),
    typeHolder.stringValue == GetSemanticClassName( Type.core ),
    AnnotatedValue( U.Type, typeHolder, typeHolder.stringValue ), U.TypeId == Type.SemanticClass;
```
— 250

Fig. 2A

John bought an apple for $1.

| Key word extraction | | |
|---|---|---|
| Use semantic class | ☑ | |
| Generalize semantic class | ☑ | |
| To buy as to obtain by giving money | ○ | buy, purchase, offtake, etc. |
| To acquire as to buy or obtain for oneself | ● | acquire, takeout, enlist, etc. |
| To get as to come into possession | ○ | get, receive, fetch up, return, etc. |

Fig. 3A

John bought an apple for $1.

| Role extraction : Customer | | |
|---|---|---|
| Use semantic class | ☐ | |
| Use semantic role | ☑ | |
| Possessor | ☑ | *A boy* has two dogs |
| Possessor_Locative | ☐ | *Life* holds many surprises |
| Possessor_Metaphoric | ☐ | *Social networks* have a lot of power |

Fig. 3B

Extraction of Party attributes — 401

This Master Supplier Services Agreement (the "Agreement") is between Crossfire Corporation, a Richmond corporation, ("Crossfire") and CoolWire Corporation, (the "Supplier"). This Agreement will be effective on the 2nd of February 2015 (the "Effective Date").

| Attribute extraction : Party name | | |
|---|---|---|
| Use semantic class | ☐ | |
| Use semantic role | ☐ | |
| Use extracted information | ☑ | |
| Organization | ☑ | Extracted in the position of interest |
| [WORD]{,10} Organization | ☐ | Extracted up to 10 words to the right |
| [SNTC]{,3} Organization | ☐ | Extracted up to 3 sentences to the right |
| Use linear context | ☑ | |
| is between... | ☑ | Left context |
| ...a Richmond corporation | ☐ | Right context |

Fig. 4A

Extraction of Party attributes — 401

This Master Supplier Services Agreement (the "Agreement") is between Crossfire Corporation, a Richmond corporation, ("Crossfire") and CoolWire Corporation, (the "Supplier"). This Agreement will be effective on the 2nd of February 2015 (the "Effective Date").

| Attribute extraction : Party name | | |
|---|---|---|
| Use semantic class | ☐ | |
| Use semantic role | ☐ | |
| Use extracted information | ☑ | |
| Organization | ☑ | Extracted in the position of interest |
| Organization [WORD]{,10} | ☑ | Extracted up to 10 words to the left |
| Organization [SNTC]{,3} | ☐ | Extracted up to 3 sentences to the left |
| Use linear context | ☑ | |
| and... | ☑ | Left context |
| ... the Supplier | ☐ | Right context |

Fig. 4B

| This | boy | is | smart | , | he' | ll | succeed | in | life |
|---|---|---|---|---|---|---|---|---|---|
| this <Pronoun, GTNoun, PersonThird> | boy <Noun, Masc, Nominativ, GTNoun, Singular> | be <Verb, GTVerb, Singular, PersonThird, ZeroType, Present, Nonnegative, NoCompositeness> | smart <Adjective, DegreePositive, GTAdjectiveAttr, FullComparison> | | he <Pronoun, Nominative \| Accusative, GTNoun, Masculine, Singular, PersonThird, RCPersonal, Unreflexive> | shall <Verb, GTVerbModal, ZeroType, Present, Nonnegative, Composite_ll> | succeed <Verb, GTInfinitive, NumberZero, PersonZero, ZeroType, TenseZero, Nonnegative> | in <Adverb, GTAdverb> | life <Adjective, DegreePositive, GTAdjectiveAttr> |
| this <Invariable> | | | smart <Verb, GTVerb, Singular, PersonFirst \| PersonSecond, ZeroType, Present, Nonnegative, NoCompositeness> | | | will <Verb, GTVerbModal, ZeroType, Present, Nonnegative, Irregular, Composite_ll> | | in <Preposition> | life <Noun, Nominative \| Accusative, GTNoun, Singular> |
| this <Pronoun, GTAdjectiveAttr, Singular, RCDemonstrative> | | be <Verb, GTVerb, Singular, PersonThird, ZeroType, Present, Nonnegative, Regular, Composite_for_t> | smart <Verb, GTVerb, Plural, ZeroType, Present, Nonnegative, NoCompositeness> | | | | succeed <Verb, GTVerb, Singular, PersonFirst \| PersonSecond, ZeroType, Present, Nonnegative, NoCompositeness> | | |
| | | | smart <Verb, GTInfinitive, NumberZero, PersonZero, ZeroType, TenseZero, Nonnegative> | | | | succeed <Verb, GTInfinitive, NumberZero, PersonZero, ZeroType, TenseZero, Nonnegative> | | |
| | | | smart <Adverb, DegreePositive, GTAdverb, FullComparison> | | | | | | |
| | | | smart <Noun, Nominative \| Accusative, GTNoun, Singular> | | | | | | |

SYSTEM AND METHOD OF AUTOMATIC TEMPLATE GENERATION

CROSS REFERENCE TO RELATED APPLICATIONS

The present application claims the benefit of priority under 35 U.S.C. 119 to Russian Patent Application No. 2018134347, filed Oct. 1, 2018; the disclosure of which is herein incorporated by reference in its entirety for all purposes.

TECHNICAL FIELD

The present disclosure is generally related to computer systems, and is more specifically related to systems and methods for natural language processing.

BACKGROUND

Information extraction may involve analyzing a natural language text to recognize and classify information objects in the text in accordance with a pre-defined set of categories (such as names of persons, organizations, locations, expressions of times, quantities, monetary values, percentages, etc.). Information extraction may further identify relationships between the recognized information objects.

SUMMARY OF THE DISCLOSURE

In accordance with one or more aspects of the present disclosure, an example method of template development may comprise: receiving, by a computer device, a first text fragment, comprising a first identifier of a first text token, wherein the first token comprises one or more words in a natural language and wherein the first token references a first information object from a first category of information objects; displaying, using a template-generating graphical user interface, a plurality of linguistic characteristics of the first token; receiving, via the template-generating graphical user interface, a first input identifying template attributes from the plurality of the linguistic characteristics of the first information object; generating a first template based at least in part on the identified template attributes; creating a first production rule for the first template; applying the first production rule to portions of a first natural language text matching the first template; displaying, using the template-generating graphical user interface, a second information object identified in the first natural language text using the first production rule.

In some implementations the first fragment may be a text fragment, a fragment of the first natural language text, a fragment of a second natural language text, and/or a fragment of a semantic structure corresponding to the first natural language text. In some implementations the method may further comprise revising, via the template-generating graphical user interface, the first production rule based on the second information object; and/or performing semantico-syntactic analysis of the first natural language text to produce a semantic structure corresponding to the first natural language text. In some implementations the linguistic characteristics of the first token may be selected from a group consisting of grammatic characteristics, syntactic characteristics, semantic characteristics, lexical class of the first token, semantic class of the first token, position of the first token, semantic class of the first token in a semantic hierarchy, key words, and prefixes. In some implementations the first input may comprise identifying one of more relevant linguistic characteristics of the first token from the plurality of linguistic characteristics of the first token; and/or generalizing one or more of linguistic characteristics of the first token from the plurality of linguistic characteristics of the first token. In some implementations the first information object may be a named entity corresponding a first category of named entities.

In accordance with one or more aspects of the present disclosure, an example computer system of template development may comprise: a memory; a processor, coupled to the memory, the processor configured to: receiving, by a computer device, a first text fragment, comprising a first identifier of a first text token, wherein the first token comprises one or more words in a natural language and wherein the first token references a first information object from a first category of information objects; displaying, using a template-generating graphical user interface, a plurality of linguistic characteristics of the first token; receiving, via the template-generating graphical user interface, a first input identifying template attributes from the plurality of the linguistic characteristics of the first information object; generating a first template based at least in part on the identified template attributes; creating a first production rule for the first template; applying the first production rule to portions of a first natural language text matching the first template; displaying, using the template-generating graphical user interface, a second information object identified in the first natural language text using the first production rule.

In accordance with one or more aspects of the present disclosure, an example computer-readable non-transitory storage medium comprising executable instructions that, when executed by a computer system, cause the computer system to: receive, by a computer device, a first text fragment, comprising a first identifier of a first text token, wherein the first token comprises one or more words in a natural language and wherein the first token references a first information object from a first category of information objects; display, using a template-generating graphical user interface, a plurality of linguistic characteristics of the first token; receive, via the template-generating graphical user interface, a first input identifying template attributes from the plurality of the linguistic characteristics of the first information object; generate a first template based at least in part on the identified template attributes; create a first production rule for the first template; apply the first production rule to portions of a first natural language text matching the first template; display, using the template-generating graphical user interface, a second information object identified in the first natural language text using the first production rule.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2A depicts an example rule of information extraction from natural language texts, in accordance with one or more aspects of the present disclosure;

FIG. 3A depicts an example semantic class selection window in GUI for the example sentence, in accordance with one or more aspects of the present disclosure;

FIG. 3B depicts an example semantic relationship selection window in GUI for the example sentence, in accordance with one or more aspects of the present disclosure;

FIGS. 4A and 4B depict an example window in GUI displaying selection of attributes of an extracted object with reference to participating parties, in accordance with one or more aspects of the present disclosure;

FIG. 6 schematically illustrates an example of a lexico-morphological structure of a sentence, in accordance with one or more aspects of the present disclosure;

DETAILED DESCRIPTION

Figure 1:
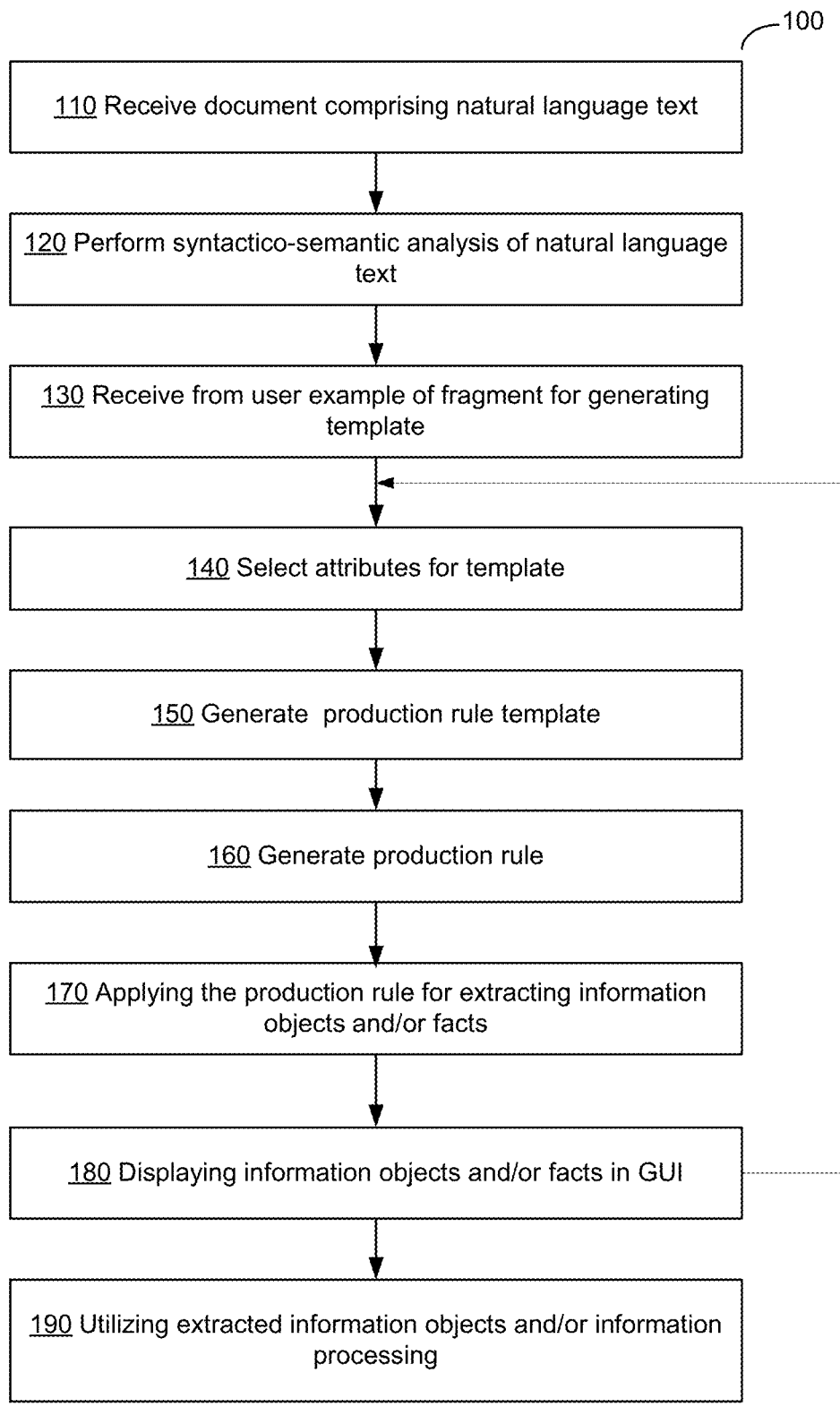
FIG. 1 depicts a flow diagram of one illustrative example of a method for creating templates for rules of information extraction from natural language texts, in accordance with one or more aspects of the present disclosure.

Described herein are methods and systems for automatically creating templates of rules to be used to extract information from natural language texts. Rules for extraction of entities and facts are usually created manually by an ontology specialist. The process is very complex and is usually performed by highly qualified specialists with detailed knowledge of the ontology's subject matter and great familiarity with the structure of the document set, being processed for fact extraction.

Information being extracted may comprise information objects, their attributes, relationships among them, as well as facts, connected by the information objects, etc. Information objects may further be added to an ontology or may be exported in Resource Definition Framework (RDF) or other format.

"Ontology" herein shall refer to a model representing objects pertaining to a certain branch of knowledge (subject area) and relationships among such objects. An ontology may comprise definitions of a plurality of classes (or categories), such that each class corresponds to a concept of the subject area. Each class definition may comprise definitions of one or more objects associated with the class. Following the generally accepted terminology, an ontology class may also be referred to as concept, and an object belonging to a class may also be referred to as an instance of the concept.

Each class definition may further comprise one or more relationship definitions describing the types of relationships that may be associated with the objects of the class. Relationships define various types of interaction between the associated objects. In certain implementations, various relationships may be organized into an inclusive taxonomy, e.g., "being a father" and "being a mother" relationships may be included into a more generic "being a parent" relationship, which in turn may be included into a more generic "being a blood relative" relationship. Each class definition may further comprise one or more restrictions defining certain properties of the objects of the class. In certain implementations, a class may be an ancestor or a descendant of another class.

An object definition may represent a real-life material object (such as a person or a thing) or a certain notion associated with one or more real life objects (such as a number or a word). In some implementations an object may be associated with two or more classes.

Sometimes an ontology is a parent and/or an issue of another ontology. In such case concepts and other properties of parent ontology also ally to the issue-ontology.

Information extraction may involve analyzing a natural language text to recognize information objects, such as named entities. Named entity recognition (NER) is an information extraction task that locates and classifies tokens in a natural language text into pre-defined categories such as names of persons, organizations, locations, expressions of times, quantities, monetary values, percentages, etc. Such categories may be represented by concepts of a pre-defined or dynamically built ontology.

Once the named entities have been recognized, the information extraction may proceed to resolve co-references and anaphoric links between natural text tokens (each token may include one or more words). "Co-reference" herein shall mean a natural language construct involving two or more natural language tokens that refer to the same entity (e.g., the same person, thing, place, or organization). For example, in the sentence "Upon his graduation from MIT, John was offered a position by Microsoft," the proper noun "John" and the possessive pronoun "his" refer to the same person. Out of two co-referential tokens, the referenced token may be referred to as the antecedent, and the referring one as a proform or anaphor.

Once the named entities have been recognized and the co-references have been resolved, the information extraction may proceed to identify relationships between the recognized named entities and/or other informational objects. Examples of such relationships include employment of a person X by an organizational entity Y, location of an object X in a geo-location Y, acquiring an organizational entity X by an organizational entity Y, etc. Such relationships may be expressed by natural language fragments that may comprise a plurality of words of one or more sentences.

Relationships between the recognized named entities and/or other information objects are referenced herein as "facts." A fact may be associated with one or more fact categories.

For example, a fact associated with a person may be related to the person's birth, education, occupation, employment, etc. In another example, a fact associated with a business transaction may be related to the type of transaction and the parties to the transaction, the obligations of the parties, the date of signing the agreement, the date of the performance, the payments under the agreement, etc.

Facts associated with the same category may be expressed by various language constructs having various morphological, lexical, and syntactic attributes. For example, the following phrases express the fact of employment of a person X by an organizational entity Y: John is employed by IBM. Paul has been working for Microsoft for over five years. George is a department head at Hewlett Packard.

A category of facts (e.g., related to a person's employment history) may be organized in hierarchical structures and may be associated with ontology classes. The methods described herein assume that facts associated with the same category (and the same ontology concept) may be expressed by fragments of natural language text that have similar language-independent semantic structures. Such semantic structures may be detected by classifier functions, parameters of which may be adjusted by supervised learning methods, as described in more details herein below.

In accordance with one or more aspects of the present disclosure, a computing device may receive a natural language text (e.g., a document or a collection of documents) associated with a certain text corpus). The computing device may further receive one or more identifiers of natural language text tokens that reference example information objects (e.g., named entities) and facts associated with example information object categories (e.g., example categories of named entities).

The computing device may further create semantico-syntactic structures by semantic-syntactic structure analysis, such that each semantic structure would represent a natural language sentence. A semantic structure may be represented by an acyclic graph that includes a plurality of nodes corresponding to semantic classes and a plurality of edges corresponding to semantic relationships, as described in more details herein below with reference to FIG. 15. The process of semantic-syntactic analysis may be performed in accordance with a sequence of operations described below by FIG. 5. Alternatively, the computer device may receive an example of a semantic-syntactic structure of the natural language example sentence from a user or from another application.

To extract a plurality of objects represented by the identified named entities and related facts in certain implementations, the computing device may interpret the plurality of semantic structures using a set of production rules, as described in more details herein below. Alternatively, the computing device may employ one or more classifier functions which may, in an illustrative example, be defined in a hyperspace of natural language token attributes in order to determine the degree of association of an input natural language token with a corresponding category of named entities. The token attributes may include morphological, lexical, and/or semantic attributes, as described in more details herein above.

The computing device may receive a set of documents, produce a plurality of semantic structures representing at least a portion of sentences of texts of these documents and identify, among a plurality of semantic structures produced by the semantico-syntactic analysis, one or more candidate semantic structures that comprise elements corresponding to the previously identified tokens representing named entities, and that are similar, in view of a certain similarity metric, to at least one of semantic structures representing the sentences that include the user-highlighted words associated with the example categories of named entities. In certain implementations, in estimating the degree of association of a given semantic structure with a certain fact category, the computing device may employ automated classification methods (also known as "machine learning" methods) that utilize a pre-existing or dynamically created training data set and evidence data set that correlates the semantic structure parameters and fact categories. Such methods may include differential evolution methods, genetic algorithms, naïve Bayes classifier, random forest methods, neural networks, etc.

The production rules employed for interpreting the semantic structures may comprise interpretation rules and identification rules. An interpretation rule may comprise a left-hand side represented by a set of logical expressions defined on one or more semantic structure templates and a right-hand side represented by one or more statements regarding the informational objects representing the entities referenced by the natural language text.

A semantic structure template may comprise certain semantic structure elements (e.g., association with a certain lexical/semantic class, association with a certain surface or deep slot, the presence of a certain grammeme or sememe etc.). In some implementations the semantic structure template may comprise variables. The variables may be substituted by corresponding lexical/semantic class, surface or deep slot, grammeme, sememe etc. The relationships between the semantic structure elements may be specified by one or more logical expressions (conjunction, disjunction, and negation) and/or by operations describing mutual positions of nodes within the syntactico-semantic tree. In an illustrative example, such an operation may verify whether one node belongs to a subtree of another node.

Matching the template defined by the left-hand side of a production rule to a semantic structure representing at least part of a sentence of the natural language text may trigger the right-hand side of the production rule. The right-hand side of the production rule may associate one or more attributes (reflecting lexical, syntactic, and/or semantic properties of the words of an original sentence) with the informational objects represented by the nodes and/or modify values of one or more attributes. In an illustrative example, the right-hand side of an interpretation rule may comprise a statement associating a token of the natural language text with a category of information objects.

An identification rule may be employed to associate a pair of informational objects which represent the same real world entity. An identification rule is a production rule, the left-hand side of which comprises one or more logical expressions referencing the semantic tree nodes corresponding to the informational objects. If the pair of informational objects satisfies the conditions specified by the logical expressions, the informational objects are merged into a single informational object.

The present invention comprises a method and a system for automatic generation of templates for information extraction rules to extract information objects from natural language texts. This functionality allows regular system users to extract information object "by providing examples", i.e. by just selecting sample tokens containing the desired semantic structure associated with the information object of interest, without assistance from ontology engineers, trained in both syntax of rules of information extraction and the specific subject matter of the natural language texts.

Various aspects of the above referenced methods and systems are described in detail herein below by way of examples, rather than by way of limitation.

FIG. 1 depicts a flow diagram of one illustrative example of a method for automatic generation of templates to be used in extraction of facts from natural language texts, in accordance with one or more aspects of the present disclosure.

Method 100 and/or each of its individual functions, routines, subroutines, or operations may be performed by one or more processors of the computing device (e.g., computing device 1000 of FIG. 16) implementing the method. In certain implementations, method 100 may be performed by a single processing thread. Alternatively, method 100 may be performed by two or more processing threads, each thread implementing one or more individual functions, routines, subroutines, or operations of the method. In an illustrative example, the processing threads implementing method 100 may be synchronized (e.g., using semaphores, critical sections, and/or other thread synchronization mechanisms). Alternatively, the processing threads implementing method 100 may be executed asynchronously with respect to each other.

At block 110, a computing device implementing the method may receive a natural language text (e.g., a document or a collection of documents). In an illustrative example, the computing device may receive the natural language text in the form of an electronic document which may be produced by scanning or otherwise acquiring an image of a paper document and performing optical character recognition (OCR) to produce the document text associated with the documents. In an illustrative example, the computing device may receive the natural language text in the form of one or more formatted files, such as word processing files, electronic mail messages, digital content files, etc.

At block 120, the computing device may perform a semantico-syntactic analysis of the natural language text. The syntactic and sematic analysis may yield a plurality of semantic structures, such that each semantic structure would represent a corresponding natural language sentence. As will be described below, the semantic structure may be represented by an acyclic graph that includes a plurality of nodes corresponding to semantic classes and a plurality of edges corresponding to semantic relationships, as described in more details herein below with reference to FIG. 13. For simplicity, any subset of a semantic structure shall be referred herein as a "structure" (rather than a "substructure"), unless the parent-child relationship between two semantic structures is at issue.

In accordance with one or more aspects of the present disclosure, the computing device implementing the methods described herein may index one or more parameters of the semantico-syntactic structure. The resulting index may comprise the plurality of words comprised by the original text corpus, pluralities of lexical classes, semantic classes, index of some or all lexical, syntactic and semantic characteristics, yielded by the semantico-syntactic analysis, as well as the index of such resulting semantic structures.

At block 130, the computing device may receive a text fragment representing a template of the production rule. A text fragment is a portion of a natural language text containing one or more words. A text fragment may include one or more sentences, phrases, words, etc. In an illustrative example, the computing device may receive an example of natural language text typed or highlighted by a user.

Such text fragment is a word or plurality of words to which this production rule may be applied. To represent the rule template, the text fragment includes at least one identifier of one or more text tokens referencing an information object from a class of information objects. The production rule consists of a left portion (to the left of the symbol "=>") and a right portion (to the right of the symbol "=>"). The left portion of the rule represents a rule template.

FIG. 2A demonstrates an example production rule in one of implementation of the present inventions. This example production rule illustrates extraction of information regarding an administrative territorial unit. Such production rule may be applied to different types of natural language texts, such as encyclopedia article, wiki-page, reference book, etc. The left part of the production rule shown on FIG. 2A includes a rule template, which contains a predicate having a semantic class "BE" 210 as a core and other lexemes of different classes, to fill the deep slots of the sentence. In this rule, if a sentence includes a predicate represented by a verb "be" and the semantic structure of the sentence includes a node, having semantic class ADMINISTRATIVE_AND_TERRITORIAL_UNIT 215 (such as countries, localities, cities, etc.), or semantic class VICINITY 220 (location, place, zone, etc.), but not included into semantic class COUNTRY_BY_NAME 225, in a deep slot (Relation_Relative и Relation_correlative) 230, then this rule is applicable to such sentence.

Figure 2B:
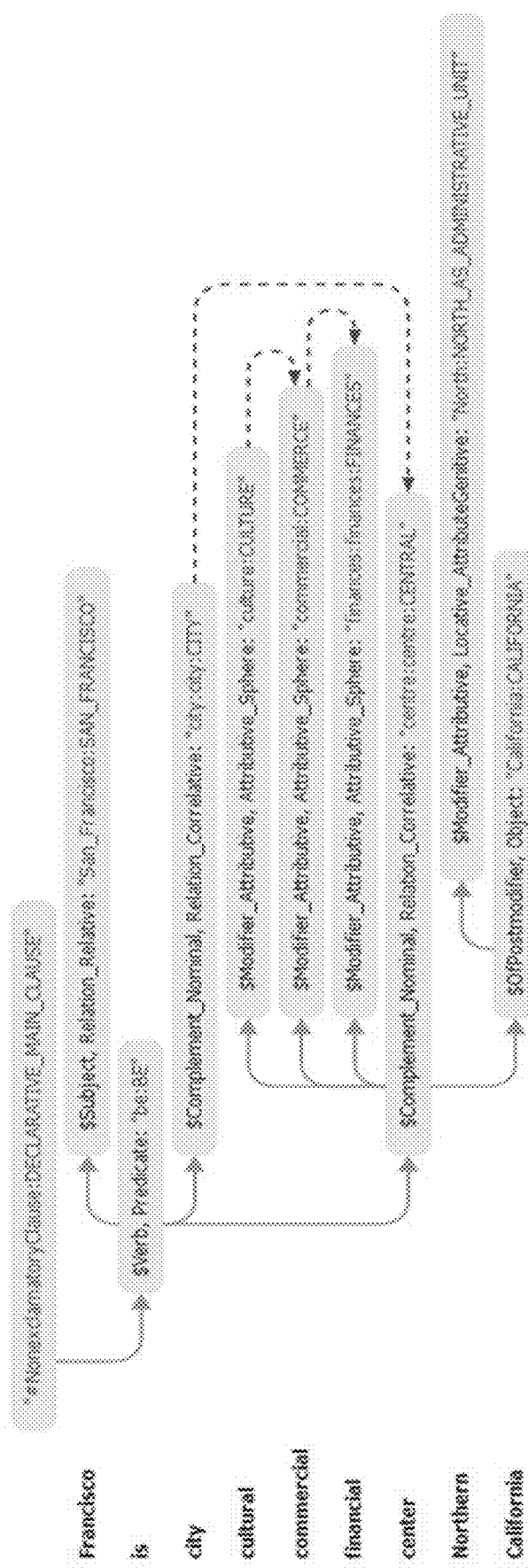
FIG. 2B depicts an example semantic structure of a sentence. The rule 2A can be applied to the sentence, represented by the semantic structure 2B, in accordance with one or more aspects of the present disclosure.

For instance, the rule of FIG. 2A is applicable to the sentence "San Francisco is the city and cultural, commercial, and financial center of Northern California". FIG. 2B depicts semantic structure of this sentence. The rule 2A is applicable to the sentence of 2B because the semantic class CITY 235 is a child class in relationship to the semantic class ADMINISTRATIVE_AND_TERRITORIAL_UNIT 215, i.e. lexical unit CITY also belongs to the semantic class ADMINISTRATIVE_AND_TERRITORIAL_UNIT.

The text fragment received by the computing device at block 130 may include one or more text tokens consisting of words in a natural language. These tokens reference at least one information object belonging to a certain class of information objects. For example, the sentence San Francisco is the city and cultural, commercial, and financial center of Northern California includes token San Francisco is the city which includes information object San Francisco of class of information objects Named Entities.

In certain implementations, the example text fragment and token identifiers may be received from a user via a graphical user interface (GUI). Such a GUI may include various controls to allow the user to select text fragments in natural language texts and to highlight, within the natural language text displayed within the GUI screen, one or more words representing an example text token representing the rule in question.

Alternatively, the user may select text fragments and text tokens of interest using representations of the text's semantic structure by identifying fragments or specific elements (such as specific nodes or connections) of the semantic structure, that are defining for the production rule template.

In other implementations the system may receive identifications of the tokens as metadata of the natural language text.

At block 140, the computing device may present to user one or more linguistic characteristics of the identified tokens, derived by the system from the semantic structure of the corresponding sentences. The linguistic characteristics that may be presented to the user at block 140 may include its grammatic, syntactic, and semantic characteristics, including lexical and semantic class of the token, position of the semantic class in semantic hierarchy, and other characteristics, such as key words, prefixes, etc.

Using template-generating GUI, based on provided linguistic characteristics, the user may identify template attributes for the information objects for the production rule template. The user may also implement generalization of the rule. For instance, the user may replace an identified semantic class with a parent class in a semantic hierarchy, generalize a deep slot, or generalize meaning of an attribute.

FIG. 3A depicts an example template-generating Key Word Extractor GUI window 305 for semantic class selection. The sentence John bought an apple for $1 is used in this example. If the user selects boxes "Use semantic class" 310 and "Generalize semantic class" 315, the system presents him with a list of available generalized semantic classes, available for the selected word "bought" 325. The table 330 includes a row for each available for generalization semantic class. The left part of the table 330 contains the "names" (335, 336, 337) of the available generalized semantic classes. The right part of the table 330 contains the lists of lexical units 340 belonging to the corresponding classes. For example, semantic class TO_ACQUIRE (336) is higher in a semantic hierarchy (and therefore more general) than semantic class TO_BUY (335). As a result, semantic class TO_ACQUIRE (336) includes semantic class TO_BUY (335). Similarly, semantic class TO_GET (337) is higher in a semantic hierarchy and therefore more general than semantic class TO_ACQUIRE (336). In addition, in some implementations, semantems can be added to the template, in particular, in order to filter out the semantic classes.

FIG. 3B depicts an example template-generating Role Extraction GUI window 350 for semantic role (deep slot) selection. FIG. 3B depicts selection of the semantic role Possessor in the same sentence John bought an apple for $1. Since some of the deep slots are also organized hierarchically, the semantic role can be specified by selecting a deep slot from a set of acceptable semantic roles.

To build the right portion of the production rule, the user may be presented with another window allowing the user to perform such operations as associating tokens from the natural language text to a class of information objects, associating one or more attributes with information objects, represented by nodes, modification of one or more attributes, and others.

FIGS. 4A and 4B depict an example template-generating Extraction of Party Attributes GUI window 401. This interface 401 allows the user to associate the object being extracted Crossfire Corporation 405 and CoolWire Corporation 410 with a corresponding ontology class Organization 412.

In identification type of rules, the right portion of a production rule may include operations that combine two or more information objects into a single information object.

At block 150, the computing device may generate a production rule template based on the input provided through the template-generating graphical user interface, (including such windows as 305, 350, 401). The production rule template includes a semantic structure template, representing semantic structure of the text fragment being processed.

At block 160, the computer device may create a production rule based on the production rule templates of block 150. The production rule may comprise a left-hand side represented by a set of logical expressions based on semantic structure templates corresponding to the production rule template created in block 150 and a right-hand side represented by one or more statements regarding the informational objects representing the entities referenced by the natural language text.

The semantic structure template may comprise semantic structure elements (e.g., association with a certain lexical/semantic class, association with a certain surface or deep slot, the presence of a certain grammeme or semanteme etc.). In some implementations the semantic structure template may comprise variables substituted by corresponding lexical/semantic class, surface or deep slot, grammeme, semanteme etc. The semantic structure elements may be connected by one or more logical connectors (conjunction, disjunction, and negation) and/or by operations describing mutual positions of nodes within the syntactico-semantic tree.

At block 170, the computing device may apply the production rule of block 160 to locate the portions of the natural language text having prerequisite structures and to perform object extraction on these portions of the text using the production rules of block 160. First the system analyses the semantic structures corresponding to the natural language text to identify text portions corresponding to the production rule template. These text portions may be found by identifying in the text one or more tokens represented instances of the selected class of information objects. Matching the template defined by the left-hand side of a production rule to a semantic structure representing at least a portion of a sentence of the natural language text may trigger the right-hand side of the production rule. The right-hand side of the production rule may associate one or more attributes (reflecting lexical, syntactic, and/or semantic properties of the words of an original sentence) with the informational objects represented by the nodes and/or modify values of the one or more attributes. In an illustrative example, the right-hand side of an interpretation rule may comprise a statement associating a token of the natural language text with a category of information objects.

The objects extracted at block 170 using the rules of block 160 may be presented to the user at block 180. At this point the user may review and verify the extraction results. If the user identifies extraction errors, he/she may identify to the system missed or erroneously extracted objects. If extraction mistakes have been identified by the user, the system may return to block 140 and give the user an opportunity to further adjust the production rule template and the production rule. For instance, the user may add an exception to the rule, such as ~"COUNTRY_BY_NAME" exception 250 from FIG. 2.

If the same object was mentioned in different sentences of the natural language text, and the production rules did not identify them as one object, the user may specify that these portions of the text reference the same object. Some implementations of the present invention comprise machine learning component allowing the system to adjust the object identification rules based on the statistical analysis of user's input combining information objects.

The operations of method 100 described herein above with references to blocks 140-180 may be repeated two or more times, thus perfecting the production rules and rule templates and identifying, within the natural language text, multiple information objects corresponding to these rules.

At block 190 extracted objects and facts may be represented by a Resource Definition Framework (RDF) graph or exported in another format.

The Resource Definition Framework assigns a unique identifier to each informational object and stores the information regarding such an object in the form of SPO triplets, where S stands for "subject" and contains the identifier of the object, P stands for "predicate" and identifies some property of the object, and O stands for "object" and stores the value of that property of the object. This value can be either a primitive data type (string, number, Boolean value) or an identifier of another object. In an illustrative example, an SPO triplet may associate a token of the natural language text with a category of information objects. Then the extracted objects and facts may be utilized in various tasks of Data Processing, Big Data, Information Processing, Natural language processing etc.

Figure 5:
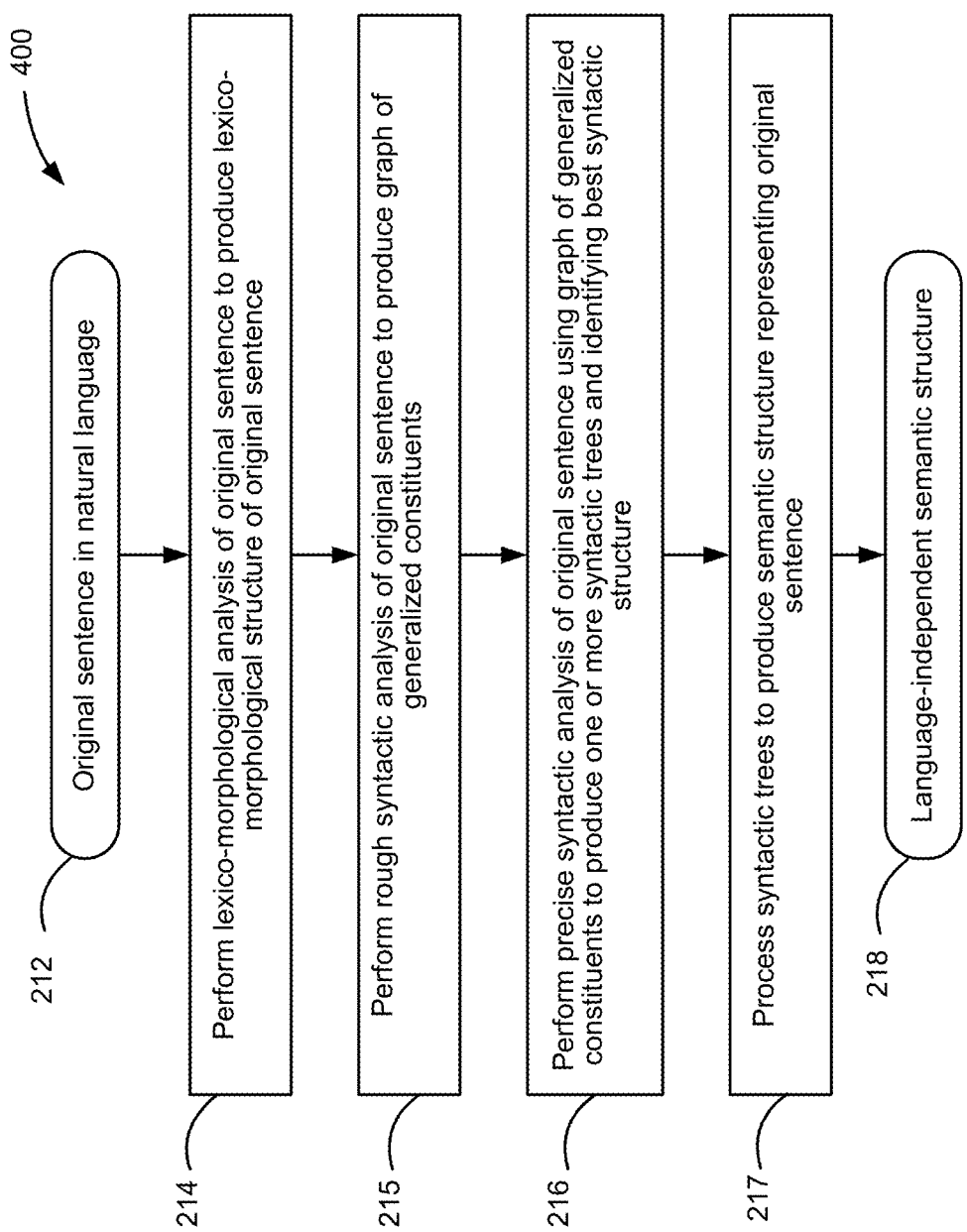
FIG. 5 depicts a flow diagram of one illustrative example of a method 400 for performing a semantico-syntactic analysis of a natural language sentence, in accordance with one or more aspects of the present disclosure.

FIG. 5 depicts a flow diagram of one illustrative example of a method 400 for performing a semantico-syntactic analysis of a natural language sentence 212, in accordance with one or more aspects of the present disclosure. Method 400 may be applied to one or more syntactic units (e.g., sentences) comprised by a certain text corpus, in order to produce a plurality of semantico-syntactic trees corresponding to the syntactic units. In various illustrative examples, the natural language sentences to be processed by method 400 may be retrieved from one or more electronic documents which may be produced by scanning or otherwise acquiring images of paper documents and performing optical character recognition (OCR) to produce the texts associated with the documents. The natural language sentences may be also retrieved from various other sources including electronic mail messages, social networks, digital content files processed by speech recognition methods, etc.

At block 214, the computer system implementing the method may perform lexico-morphological analysis of sentence 212 to identify morphological meanings of the words comprised by the sentence. "Morphological meaning" of a word herein shall refer to one or more lemma (i.e., canonical or dictionary forms) corresponding to the word and a corresponding set of values of grammatical attributes defining the grammatical value of the word. Such grammatical attributes may include the lexical category of the word and one or more morphological attributes (e.g., grammatical case, gender, number, conjugation type, etc.). Due to homonymy and/or coinciding grammatical forms corresponding to different lexico-morphological meanings of a certain word, two or more morphological meanings may be identified for a given word. An illustrative example of performing lexico-morphological analysis of a sentence is described in more detail herein below with references to FIG. 6.

At block 215, the computer system may perform a rough syntactic analysis of sentence 212. The rough syntactic analysis may include identification of one or more syntactic models which may be associated with sentence 212 followed by identification of the surface (i.e., syntactic) associations within sentence 212, in order to produce a graph of generalized constituents. "Constituent" herein shall refer to a contiguous group of words of the original sentence, which behaves as a single grammatical entity. A constituent comprises a core represented by one or more words, and may further comprise one or more child constituents at lower levels. A child constituent is a dependent constituent and may be associated with one or more parent constituents.

At block 216, the computer system may perform a precise syntactic analysis of sentence 212, to produce one or more syntactic trees of the sentence. The pluralism of possible syntactic trees corresponding to a given original sentence may stem from homonymy and/or coinciding grammatical forms corresponding to different lexico-morphological meanings of one or more words within the original sentence. Among the multiple syntactic trees, one or more best syntactic tree corresponding to sentence 212 may be selected, based on a certain rating function talking into account compatibility of lexical meanings of the original sentence words, surface relationships, deep relationships, etc.

At block 217, the computer system may process the syntactic trees to the produce a semantic structure 218 corresponding to sentence 212. Semantic structure 218 may comprise a plurality of nodes corresponding to semantic classes, and may further comprise a plurality of edges corresponding to semantic relationships, as described in more detail herein below.

FIG. 6 schematically illustrates an example of a lexico-morphological structure of a sentence, in accordance with one or more aspects of the present disclosure. Example lexical-morphological structure 500 may comprise having a plurality of "lexical meaning-grammatical value" pairs for an example sentence. In an illustrative example, "11" may be associated with lexical meaning "shall" 512 and "will" 514. The grammatical value associated with lexical meaning 512 is <Verb, GTVerbModal, ZeroType, Present, Nonnegative, Composite II>. The grammatical value associated with lexical meaning 514 is <Verb, GTVerbModal, ZeroType, Present, Nonnegative, Irregular, Composite II>.

Figure 7:
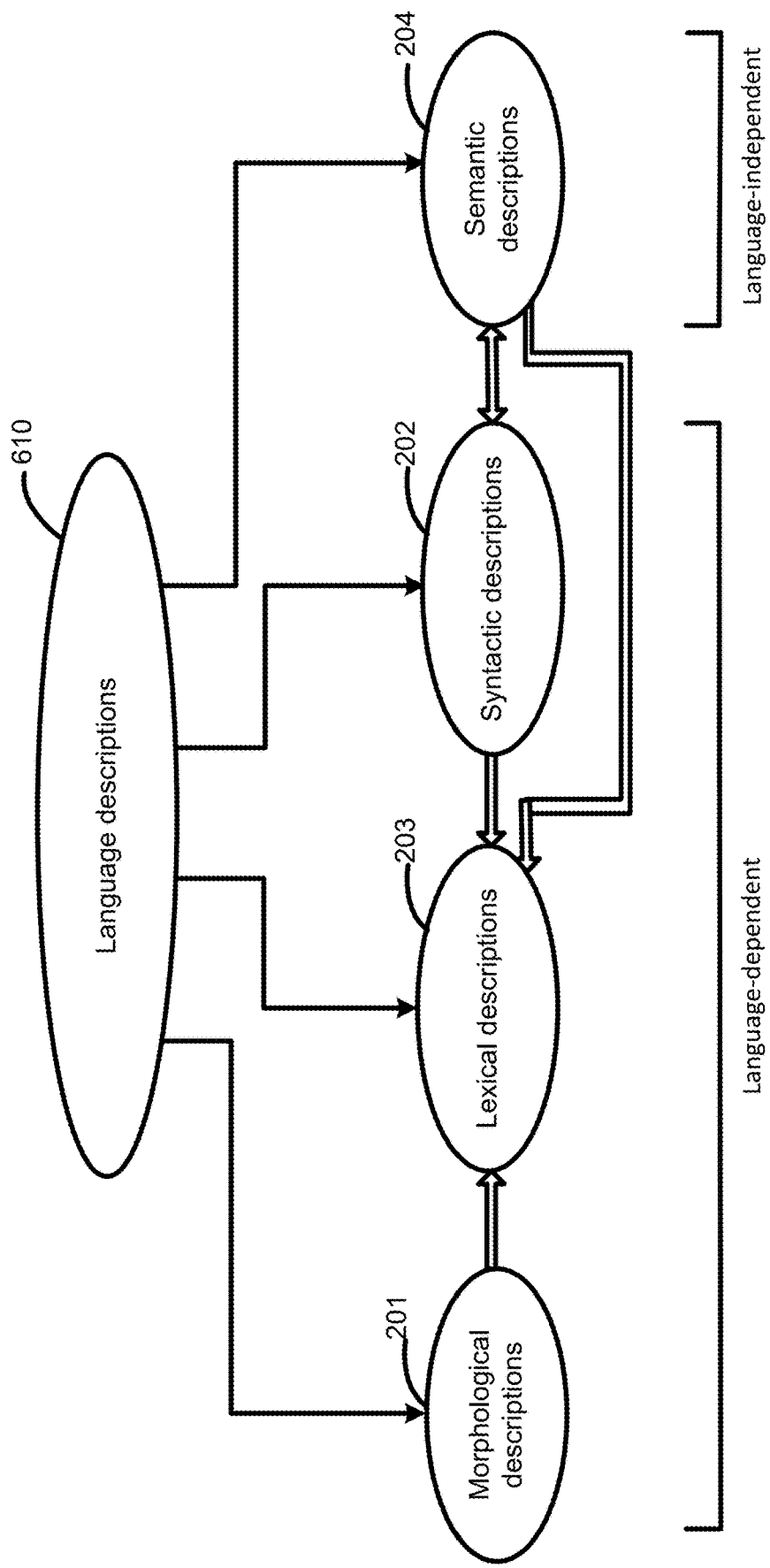
FIG. 7 schematically illustrates language descriptions representing a model of a natural language, in accordance with one or more aspects of the present disclosure.

FIG. 7 schematically illustrates language descriptions 610 including morphological descriptions 201, lexical descriptions 203, syntactic descriptions 202, and semantic descriptions 104, and their relationship thereof. Among them, morphological descriptions 201, lexical descriptions 203, and syntactic descriptions 202 are language-specific. A set of language descriptions 610 represent a model of a certain natural language.

In an illustrative example, a certain lexical meaning of lexical descriptions 203 may be associated with one or more surface models of syntactic descriptions 202 corresponding to this lexical meaning. A certain surface model of syntactic descriptions 202 may be associated with a deep model of semantic descriptions 204.

Figure 8:
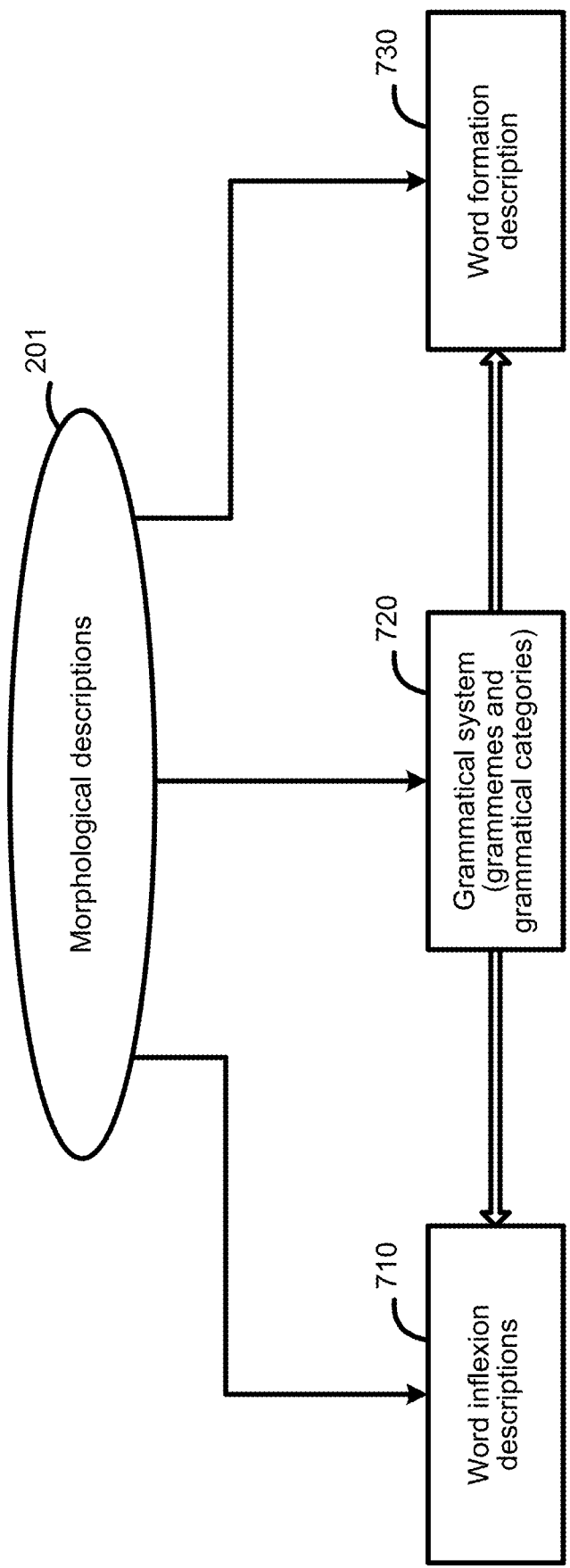
FIG. 8 schematically illustrates examples of morphological descriptions, in accordance with one or more aspects of the present disclosure.

FIG. 8 schematically illustrates several examples of morphological descriptions.

Components of the morphological descriptions 201 may include: word inflexion descriptions 710, grammatical system 720, and word formation description 730, among others. Grammatical system 720 comprises a set of grammatical categories, such as, part of speech, grammatical case, grammatical gender, grammatical number, grammatical person, grammatical reflexivity, grammatical tense, grammatical aspect, and their values (also referred to as "grammemes"), including, for example, adjective, noun, or verb; nominative, accusative, or genitive case; feminine, masculine, or neutral gender; etc. The respective grammemes may be utilized to produce word inflexion description 710 and the word formation description 730.

Word inflexion descriptions 710 describe the forms of a given word depending upon its grammatical categories (e.g., grammatical case, grammatical gender, grammatical number, grammatical tense, etc.), and broadly includes or describes various possible forms of the word. Word formation description 730 describes which new words may be constructed based on a given word (e.g., compound words).

According to one aspect of the present disclosure, syntactic relationships among the elements of the original sentence may be established using a constituent model. A constituent may comprise a group of neighboring words in a sentence that behaves as a single entity. A constituent has a word at its core and may comprise child constituents at lower levels. A child constituent is a dependent constituent and may be associated with other constituents (such as parent constituents) for building the syntactic descriptions 202 of the original sentence.

Figure 9:
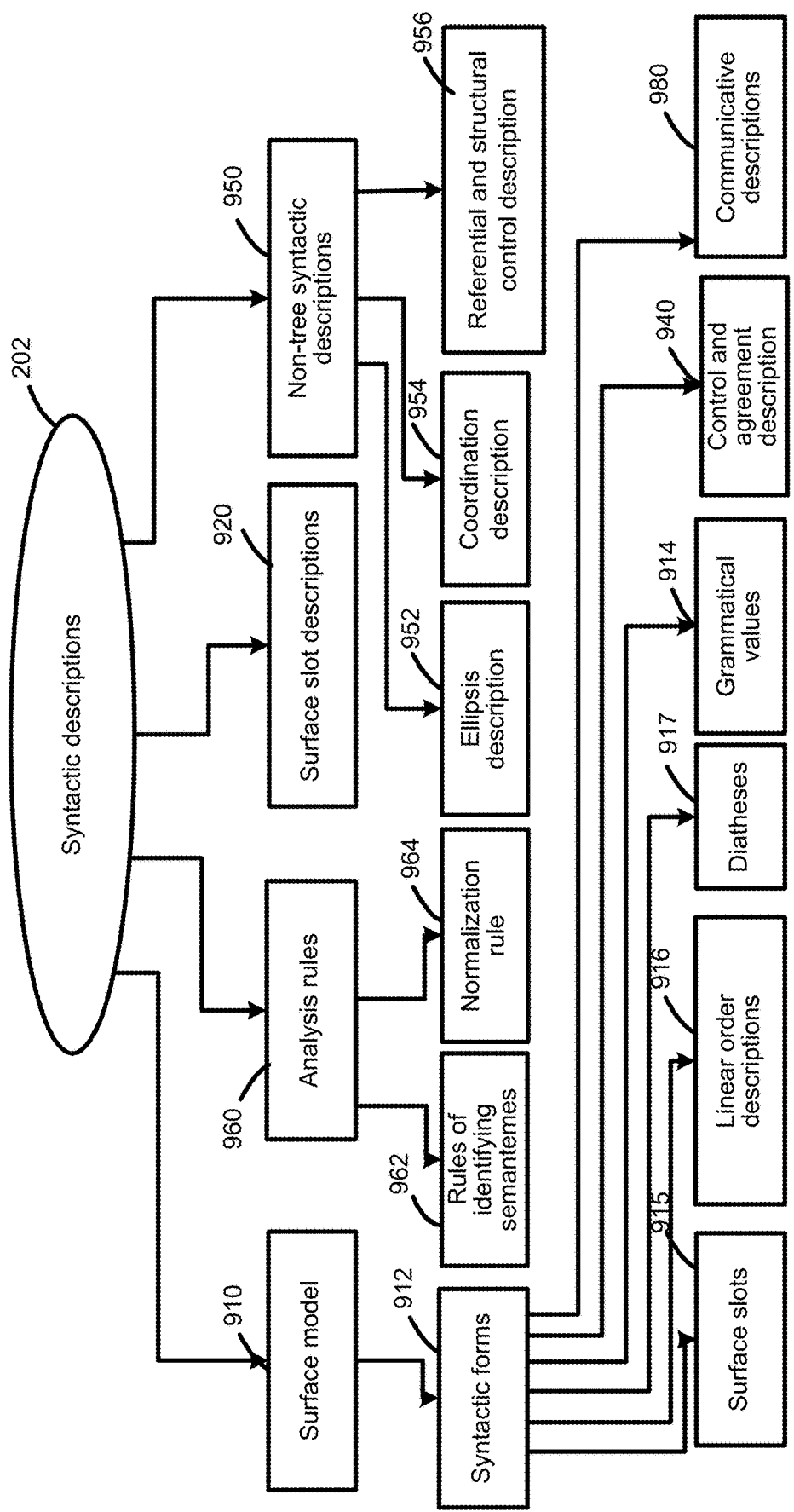
FIG. 9 schematically illustrates examples of syntactic descriptions, in accordance with one or more aspects of the present disclosure.

FIG. 9 illustrates exemplary syntactic descriptions. The components of the syntactic descriptions 202 may include, but are not limited to, surface models 910, surface slot descriptions 920, referential and structural control description 956, control and agreement description 940, non-tree syntactic description 950, and analysis rules 960. Syntactic descriptions 202 may be used to construct possible syntactic structures of the original sentence in a given natural language, taking into account free linear word order, non-tree syntactic phenomena (e.g., coordination, ellipsis, etc.), referential relationships, and other considerations.

Surface models 910 may be represented as aggregates of one or more syntactic forms ("syntforms" 912) employed to describe possible syntactic structures of the sentences that are comprised by syntactic description 102. In general, the lexical meaning of a natural language word may be linked to surface (syntactic) models 910. A surface model may represent constituents which are viable when the lexical meaning functions as the "core." A surface model may include a set of surface slots of the child elements, a description of the linear order, and/or diatheses. "Diathesis" herein shall refer to a certain relationship between an actor (subject) and one or more objects, having their syntactic roles defined by morphological and/or syntactic means. In an illustrative example, a diathesis may be represented by a voice of a verb: when the subject is the agent of the action, the verb is in the active voice, and when the subject is the target of the action, the verb is in the passive voice.

Figure 10:
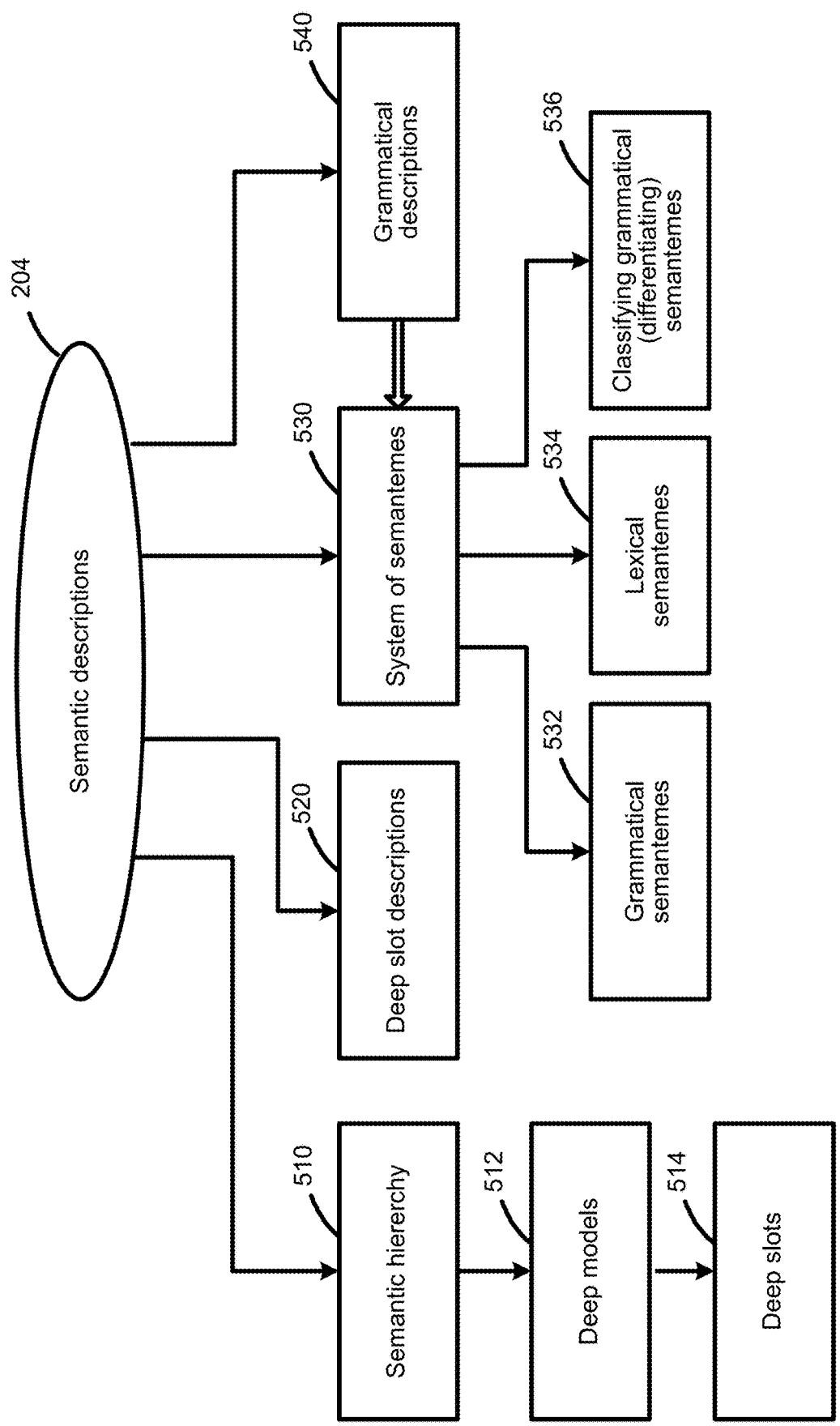
FIG. 10 schematically illustrates examples of semantic descriptions, in accordance with one or more aspects of the present disclosure.

A constituent model may utilize a plurality of surface slots 915 of the child constituents and their linear order descriptions 916 to describe grammatical values 914 of possible fillers of these surface slots. Diatheses 917 may represent relationships between surface slots 915 and deep slots 514 (as shown in FIG. 10). Communicative descriptions 980 describe communicative order in a sentence.

Linear order description 916 may be represented by linear order expressions reflecting the sequence in which various surface slots 915 may appear in the sentence. The linear order expressions may include names of variables, names of surface slots, parenthesis, grammemes, ratings, the "or" operator, etc. In an illustrative example, a linear order description of a simple sentence of "Boys play football" may be represented as "Subject Core Object Direct," where Subject, Core, and Object Direct are the names of surface slots 915 corresponding to the word order.

Communicative descriptions 980 may describe a word order in a syntform 912 from the point of view of communicative acts that are represented as communicative order expressions, which are similar to linear order expressions. The control and concord description 940 may comprise rules and restrictions which are associated with grammatical values of the related constituents and may be used in performing syntactic analysis.

Non-tree syntax descriptions 950 may be created to reflect various linguistic phenomena, such as ellipsis and coordination, and may be used in syntactic structures transformations which are generated at various stages of the analysis according to one or more aspects of the present disclosure. Non-tree syntax descriptions 950 may include ellipsis description 952, coordination description 954, as well as referential and structural control description 930, among others.

Analysis rules 960 may generally describe properties of a specific language and may be used in performing the semantic analysis. Analysis rules 960 may comprise rules of identifying semantemes 962 and normalization rules 964. Normalization rules 964 may be used for describing language-dependent transformations of semantic structures.

FIG. 10 illustrates exemplary semantic descriptions. Components of semantic descriptions 204 are language-independent and may include, but are not limited to, a semantic hierarchy 510, deep slots descriptions 520, a set of semantemes 530, and pragmatic descriptions 540.

The core of the semantic descriptions may be represented by semantic hierarchy 510 which may comprise semantic notions (semantic entities) which are also referred to as semantic classes. The latter may be arranged into hierarchical structure reflecting parent-child relationships. In general, a child semantic class may inherits one or more properties of its direct parent and other ancestor semantic classes. In an illustrative example, semantic class SUBSTANCE is a child of semantic class ENTITY and the parent of semantic classes GAS, LIQUID, METAL, WOOD_MATERIAL, etc.

Each semantic class in semantic hierarchy 510 may be associated with a corresponding deep model 512. Deep model 512 of a semantic class may comprise a plurality of deep slots 514 which may reflect semantic roles of child constituents in various sentences that include objects of the semantic class as the core of the parent constituent. Deep model 512 may further comprise possible semantic classes acting as fillers of the deep slots. Deep slots 514 may express semantic relationships, including, for example, "agent," "addressee," "instrument," "quantity," etc. A child semantic class may inherit and further expand the deep model of its direct parent semantic class.

Deep slots descriptions 520 reflect semantic roles of child constituents in deep models 512 and may be used to describe general properties of deep slots 514. Deep slots descriptions 520 may also comprise grammatical and semantic restrictions associated with the fillers of deep slots 514. Properties and restrictions associated with deep slots 514 and their possible fillers in various languages may be substantially similar and often identical. Thus, deep slots 514 are language-independent.

System of semantemes 530 may represents a plurality of semantic categories and semantemes which represent meanings of the semantic categories. In an illustrative example, a semantic category "DegreeOfComparison" may be used to describe the degree of comparison and may comprise the following semantemes: "Positive," "ComparativeHigherDegree," and "SuperlativeHighestDegree," among others. In another illustrative example, a semantic category "RelationToReferencePoint" may be used to describe an order (spatial or temporal in a broad sense of the words being analyzed), such as before or after a reference point, and may comprise the semantemes "Previous" and "Subsequent.". In yet another illustrative example, a semantic category "EvaluationObjective" can be used to describe an objective assessment, such as "Bad," "Good," etc.

System of semantemes 530 may include language-independent semantic attributes which may express not only semantic properties but also stylistic, pragmatic and communicative properties. Certain semantemes may be used to express an atomic meaning which corresponds to a regular grammatical and/or lexical expression in a natural language. By their intended purpose and usage, sets of semantemes may be categorized, e.g., as grammatical semantemes 532, lexical semantemes 534, and classifying grammatical (differentiating) semantemes 536.

Grammatical semantemes 532 may be used to describe grammatical properties of the constituents when transforming a syntactic tree into a semantic structure. Lexical semantemes 534 may describe specific properties of objects (e.g., "being flat" or "being liquid") and may be used in deep slot descriptions 520 as restriction associated with the deep slot fillers (e.g., for the verbs "face (with)" and "flood," respectively). Classifying grammatical (differentiating) sememes 536 may express the differentiating properties of objects within a single semantic class. In an illustrative example, in the semantic class of HAIRDRESSER, the sememe of <<RelatedToMen>> is associated with the lexical meaning of "barber," to differentiate from other lexical meanings which also belong to this class, such as "hairdresser," "hairstylist," etc. Using these language-independent semantic properties that may be expressed by elements of semantic description, including semantic classes, deep slots, and sememes, may be employed for extracting the semantic information, in accordance with one or more aspects of the present invention.

Pragmatic descriptions 540 allow associating a certain theme, style or genre to texts and objects of semantic hierarchy 510 (e.g., "Economic Policy," "Foreign Policy," "Justice," "Legislation," "Trade," "Finance," etc.). Pragmatic properties may also be expressed by sememes. In an illustrative example, the pragmatic context may be taken into consideration during the semantic analysis phase.

Figure 11:
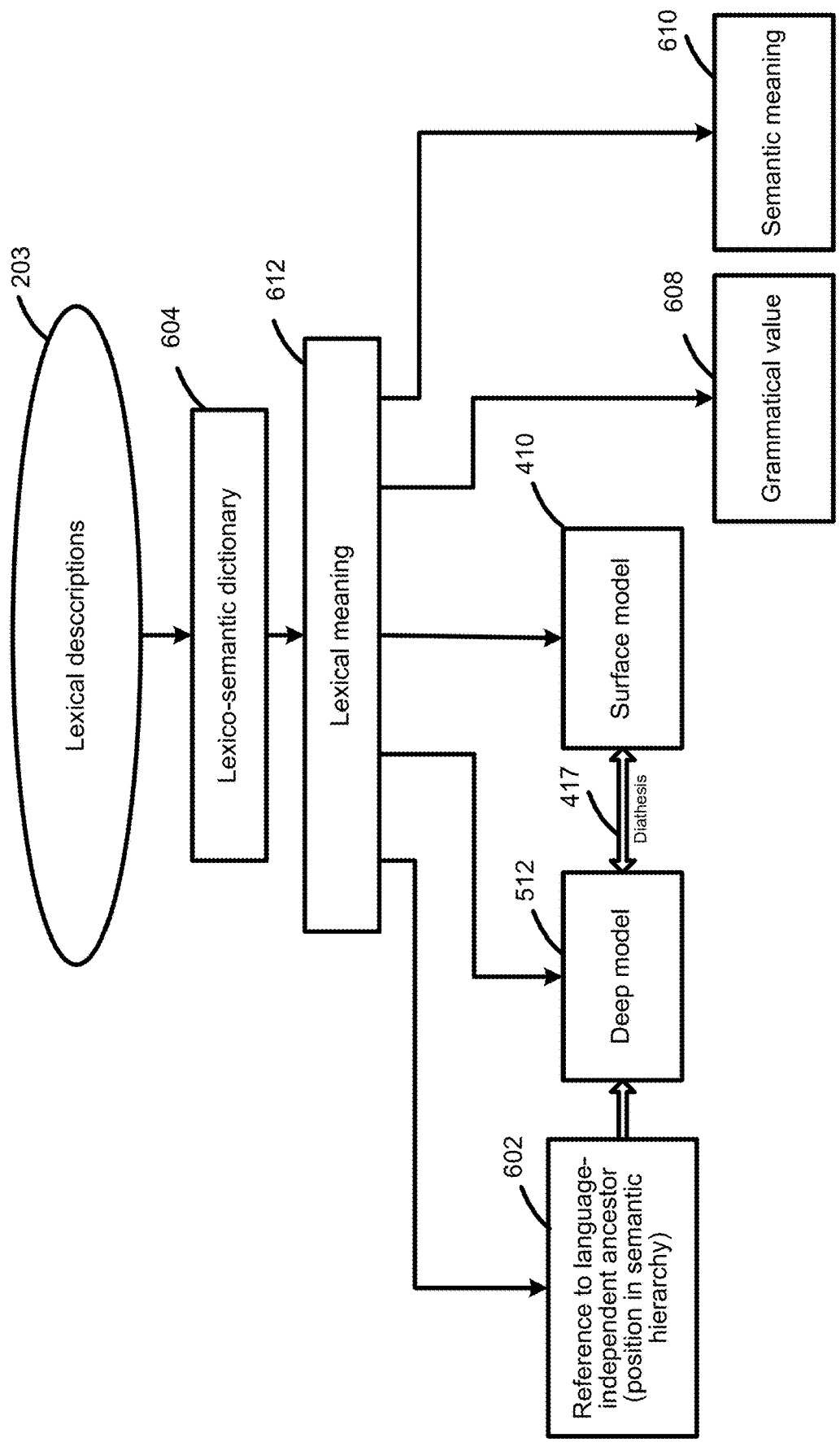
FIG. 11 schematically illustrates examples of lexical descriptions, in accordance with one or more aspects of the present disclosure.

FIG. 11 illustrates exemplary lexical descriptions. Lexical descriptions 203 represent a plurality of lexical meanings 612, in a certain natural language, for each component of a sentence. For a lexical meaning 612, a relationship 602 to its language-independent semantic parent may be established to indicate the location of a given lexical meaning in semantic hierarchy 510.

A lexical meaning 612 of lexical-semantic hierarchy 510 may be associated with a surface model 910 which, in turn, may be associated, by one or more diatheses 917, with a corresponding deep model 512. A lexical meaning 612 may inherit the semantic class of its parent, and may further specify its deep model 152.

A surface model 910 of a lexical meaning may comprise includes one or more syntforms 912. A syntform, 912 of a surface model 910 may comprise one or more surface slots 915, including their respective linear order descriptions 916, one or more grammatical values 914 expressed as a set of grammatical categories (grammemes), one or more semantic restrictions associated with surface slot fillers, and one or more of the diatheses 917. Semantic restrictions associated with a certain surface slot filler may be represented by one or more semantic classes, whose objects can fill the surface slot.

Figure 12:
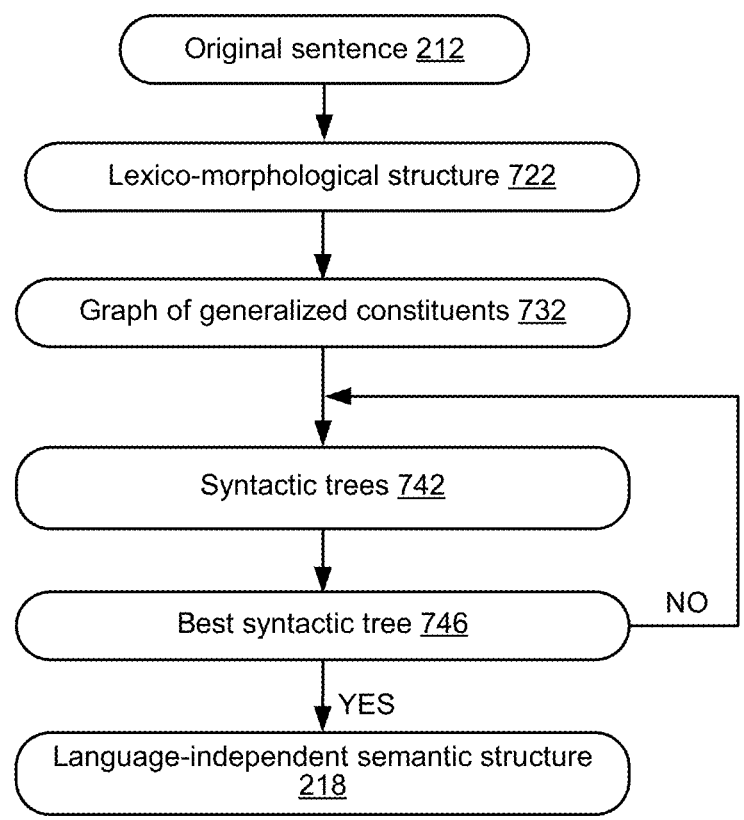
FIG. 12 schematically illustrates example data structures that may be employed by one or more methods implemented in accordance with one or more aspects of the present disclosure.

FIG. 12 schematically illustrates example data structures that may be employed by one or more methods described herein. Referring again to FIG. 5, at block 214, the computer system implementing the method may perform lexico-morphological analysis of sentence 212 to produce a lexico-morphological structure 722 of FIG. 12. Lexico-morphological structure 722 may comprise a plurality of mapping of a lexical meaning to a grammatical value for each lexical unit (e.g., word) of the original sentence. FIG. 6 schematically illustrates an example of a lexico-morphological structure.

At block 215, the computer system may perform a rough syntactic analysis of original sentence 212, in order to produce a graph of generalized constituents 732 of FIG. 12. Rough syntactic analysis involves applying one or more possible syntactic models of possible lexical meanings to each element of a plurality of elements of the lexico-morphological structure 722, in order to identify a plurality of potential syntactic relationships within original sentence 212, which are represented by graph of generalized constituents 732.

Graph of generalized constituents 732 may be represented by an acyclic graph comprising a plurality of nodes corresponding to the generalized constituents of original sentence 212, and further comprising a plurality of edges corresponding to the surface (syntactic) slots, which may express various types of relationship among the generalized lexical meanings. The method may apply a plurality of potentially viable syntactic models for each element of a plurality of elements of the lexico-morphological structure of original sentence 212 in order to produce a set of core constituents of original sentence 212. Then, the method may consider a plurality of viable syntactic models and syntactic structures of original sentence 212 in order to produce graph of generalized constituents 732 based on a set of constituents. Graph of generalized constituents 732 at the level of the surface model may reflect a plurality of viable relationships among the words of original sentence 212. As the number of viable syntactic structures may be relatively large, graph of generalized constituents 732 may generally comprise redundant information, including relatively large numbers of lexical meaning for certain nodes and/or surface slots for certain edges of the graph.

Graph of generalized constituents 732 may be initially built as a tree, starting with the terminal nodes (leaves) and moving towards the root, by adding child components to fill surface slots 915 of a plurality of parent constituents in order to reflect all lexical units of original sentence 212.

Figure 13:
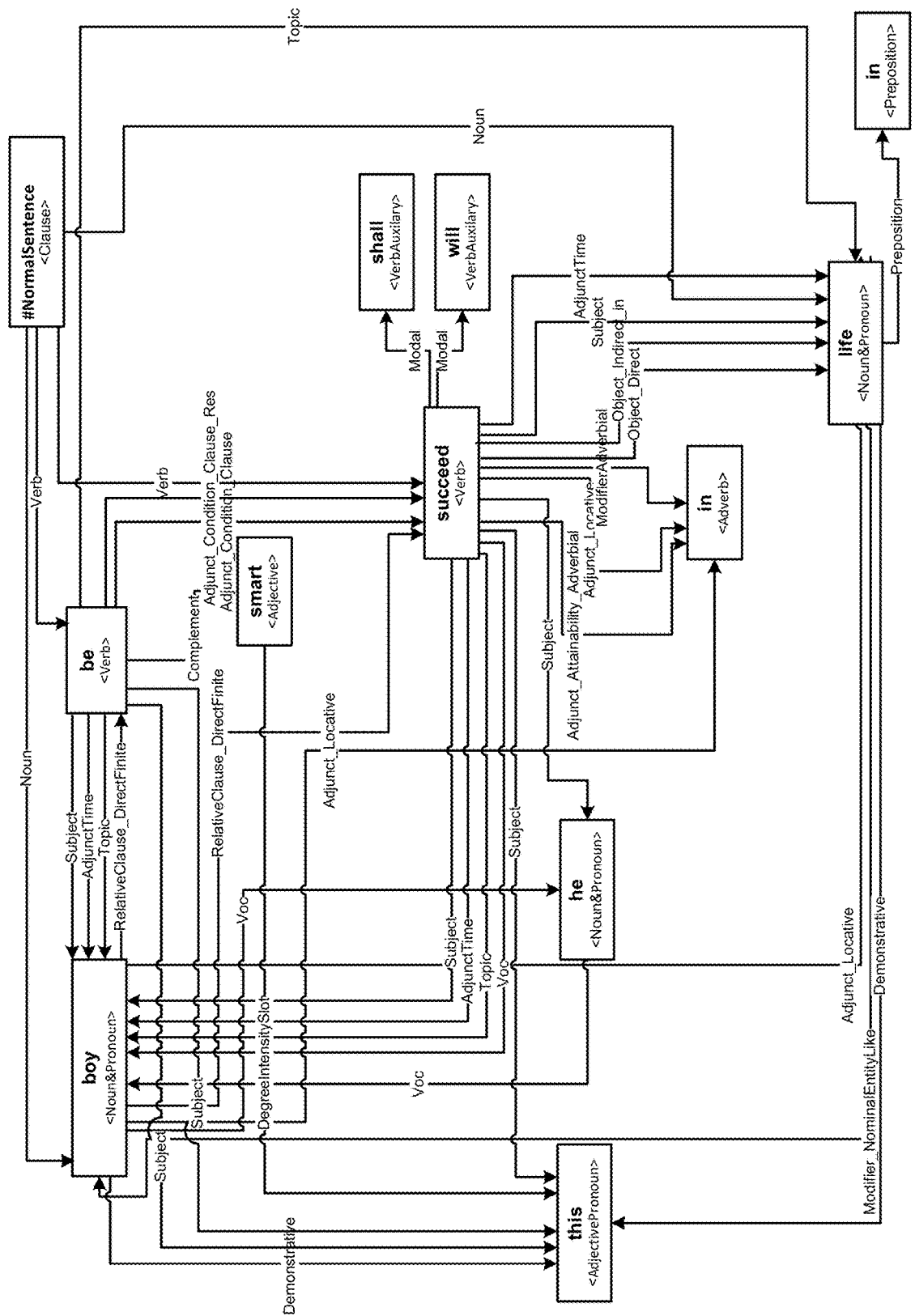
FIG. 13 schematically illustrates an example graph of generalized constituents, in accordance with one or more aspects of the present disclosure.

In certain implementations, the root of graph of generalized constituents 732 represents a predicate. In the course of the above described process, the tree may become a graph, as certain constituents of a lower level may be included into one or more constituents of an upper level. A plurality of constituents that represent certain elements of the lexico-morphological structure may then be generalized to produce generalized constituents. The constituents may be generalized based on their lexical meanings or grammatical values 914, e.g., based on part of speech designations and their relationships. FIG. 13 schematically illustrates an example graph of generalized constituents.

At block 216, the computer system may perform a precise syntactic analysis of sentence 212, to produce one or more syntactic trees 742 of FIG. 12 based on graph of generalized constituents 732. For each of one or more syntactic trees, the computer system may determine a general rating based on certain calculations and a priori estimates. The tree having the optimal rating may be selected for producing the best syntactic structure 746 of original sentence 212.

In the course of producing the syntactic structure 746 based on the selected syntactic tree, the computer system may establish one or more non-tree links (e.g., by producing redundant path among at least two nodes of the graph). If that process fails, the computer system may select a syntactic tree having a suboptimal rating closest to the optimal rating, and may attempt to establish one or more non-tree relationships within that tree. Finally, the precise syntactic analysis produces a syntactic structure 746 which represents the best syntactic structure corresponding to original sentence 212. In fact, selecting the best syntactic structure 746 also produces the best lexical values 240 of original sentence 212.

At block 217, the computer system may process the syntactic trees to the produce a semantic structure 218 corresponding to sentence 212. Semantic structure 218 may reflect, in language-independent terms, the semantics conveyed by original sentence. Semantic structure 218 may be represented by an acyclic graph (e.g., a tree complemented by at least one non-tree link, such as an edge producing a redundant path among at least two nodes of the graph). The original natural language words are represented by the nodes corresponding to language-independent semantic classes of semantic hierarchy 510. The edges of the graph represent deep (semantic) relationships between the nodes. Semantic structure 218 may be produced based on analysis rules 960, and may involve associating, one or more attributes (reflecting lexical, syntactic, and/or semantic properties of the words of original sentence 212) with each semantic class.

Figure 14:
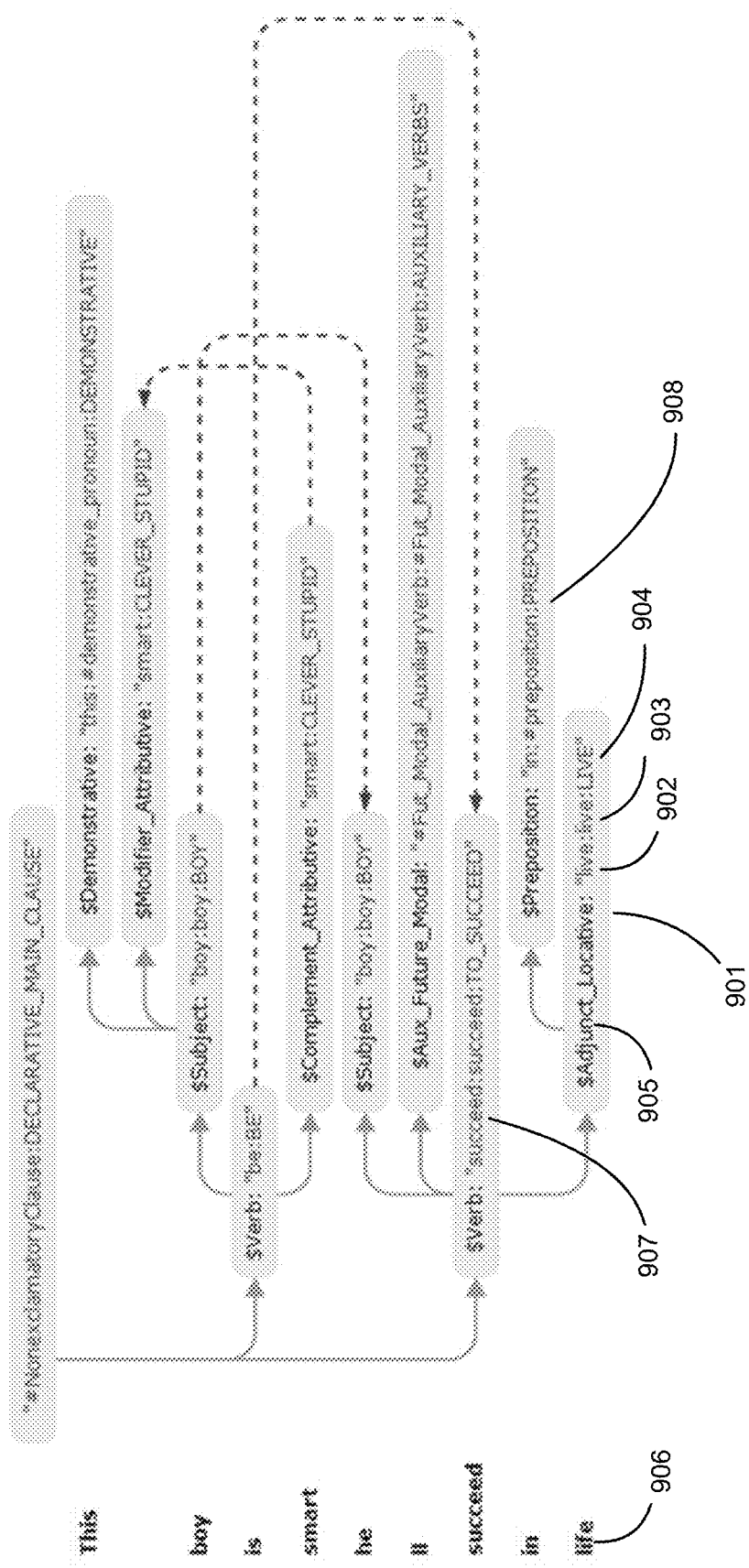
FIG. 14 illustrates an example syntactic structure corresponding to the sentence illustrated by FIG. 13.

FIG. 14 illustrates an example syntactic structure of a sentence derived from the graph of generalized constituents illustrated by FIG. 13. Node 901 corresponds to the lexical element "life" 906 in original sentence 212. By applying the method of syntactico-semantic analysis described herein, the computer system may establish that lexical element "life" 906 represents one of the lexemes of a derivative form "live" 902 associated with a semantic class "LIVE" 904, and fills in a surface slot $Adjunctr_Locative (905) of the parent constituent, which is represented by a controlling node $Verb:succeed:succeed:TO_SUCCEED (907).

Figure 15:
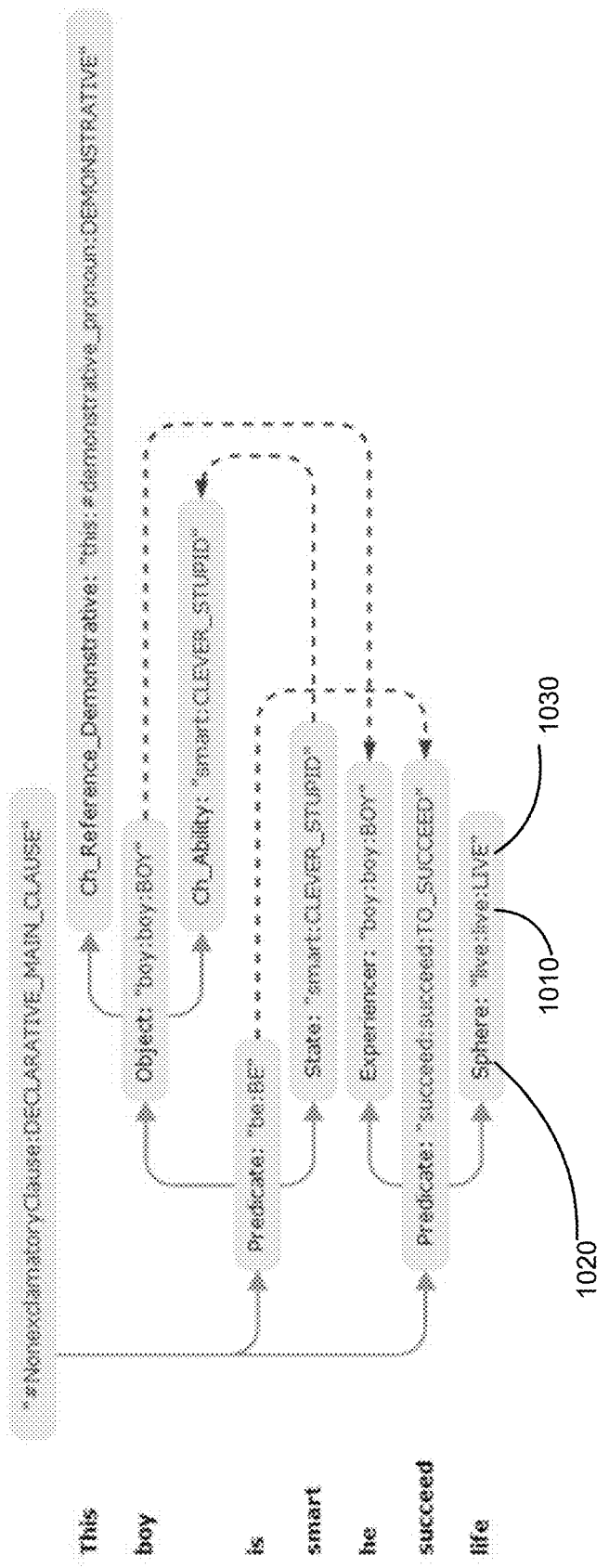
FIG. 15 illustrates a semantic structure corresponding to the syntactic structure of FIG. 14.

FIG. 15 illustrates a semantic structure corresponding to the syntactic structure of FIG. 14. With respect to the above referenced lexical element "life" 906 of FIG. 14, the semantic structure comprises lexical class 1010 and semantic classes 1030 similar to those of FIG. 14, but instead of surface slot 905, the semantic structure comprises a deep slot "Sphere" 1020.

As noted herein above, and ontology may be provided by a model representing objects pertaining to a certain branch of knowledge (subject area) and relationships among such objects. Thus, an ontology is different from a semantic hierarchy, despite the fact that it may be associated with elements of a semantic hierarchy by certain relationships (also referred to as "anchors"). An ontology may comprise definitions of a plurality of classes, such that each class corresponds to a concept of the subject area. Each class definition may comprise definitions of one or more objects associated with the class. Following the generally accepted terminology, an ontology class may also be referred to as concept, and an object belonging to a class may also be referred to as an instance of the concept.

In accordance with one or more aspects of the present disclosure, the computer system implementing the methods described herein may index one or more parameters yielded by the semantico-syntactic analysis. Thus, the methods described herein allow considering not only the plurality of words comprised by the original text corpus, but also pluralities of lexical meanings of those words, by storing and indexing all syntactic and semantic information produced in the course of syntactic and semantic analysis of each sentence of the original text corpus. Such information may further comprise the data produced in the course of intermediate stages of the analysis, the results of lexical selection, including the results produced in the course of resolving the ambiguities caused by homonymy and/or coinciding grammatical forms corresponding to different lexico-morphological meanings of certain words of the original language.

One or more indexes may be produced for each semantic structure. An index may be represented by a memory data structure, such as a table, comprising a plurality of entries. Each entry may represent a mapping of a certain semantic structure element (e.g., one or more words, a syntactic relationship, a morphological, lexical, syntactic or semantic property, or a syntactic or semantic structure) to one or more identifiers (or addresses) of occurrences of the semantic structure element within the original text.

In certain implementations, an index may comprise one or more values of morphological, syntactic, lexical, and/or semantic parameters. These values may be produced in the course of the two-stage semantic analysis, as described in more detail herein. The index may be employed in various natural language processing tasks, including the task of performing semantic search.

The computer system implementing the method may extract a wide spectrum of lexical, grammatical, syntactic, pragmatic, and/or semantic characteristics in the course of performing the syntactico-semantic analysis and producing semantic structures. In an illustrative example, the system may extract and store certain lexical information, associations of certain lexical units with semantic classes, information regarding grammatical forms and linear order, information regarding syntactic relationships and surface slots, information regarding the usage of certain forms, aspects, tonality (e.g., positive and negative), deep slots, non-tree links, semantemes, etc.

The computer system implementing the methods described herein may produce, by performing one or more text analysis methods described herein, and index any one or more parameters of the language descriptions, including lexical meanings, semantic classes, grammemes, semantemes, etc. Semantic class indexing may be employed in various natural language processing tasks, including semantic search, classification, clustering, text filtering, etc. Indexing lexical meanings (rather than indexing words) allows searching not only words and forms of words, but also lexical meanings, i.e., words having certain lexical meanings. The computer system implementing the methods described herein may also store and index the syntactic and semantic structures produced by one or more text analysis methods described herein, for employing those structures and/or indexes in semantic search, classification, clustering, and document filtering.

Figure 16:
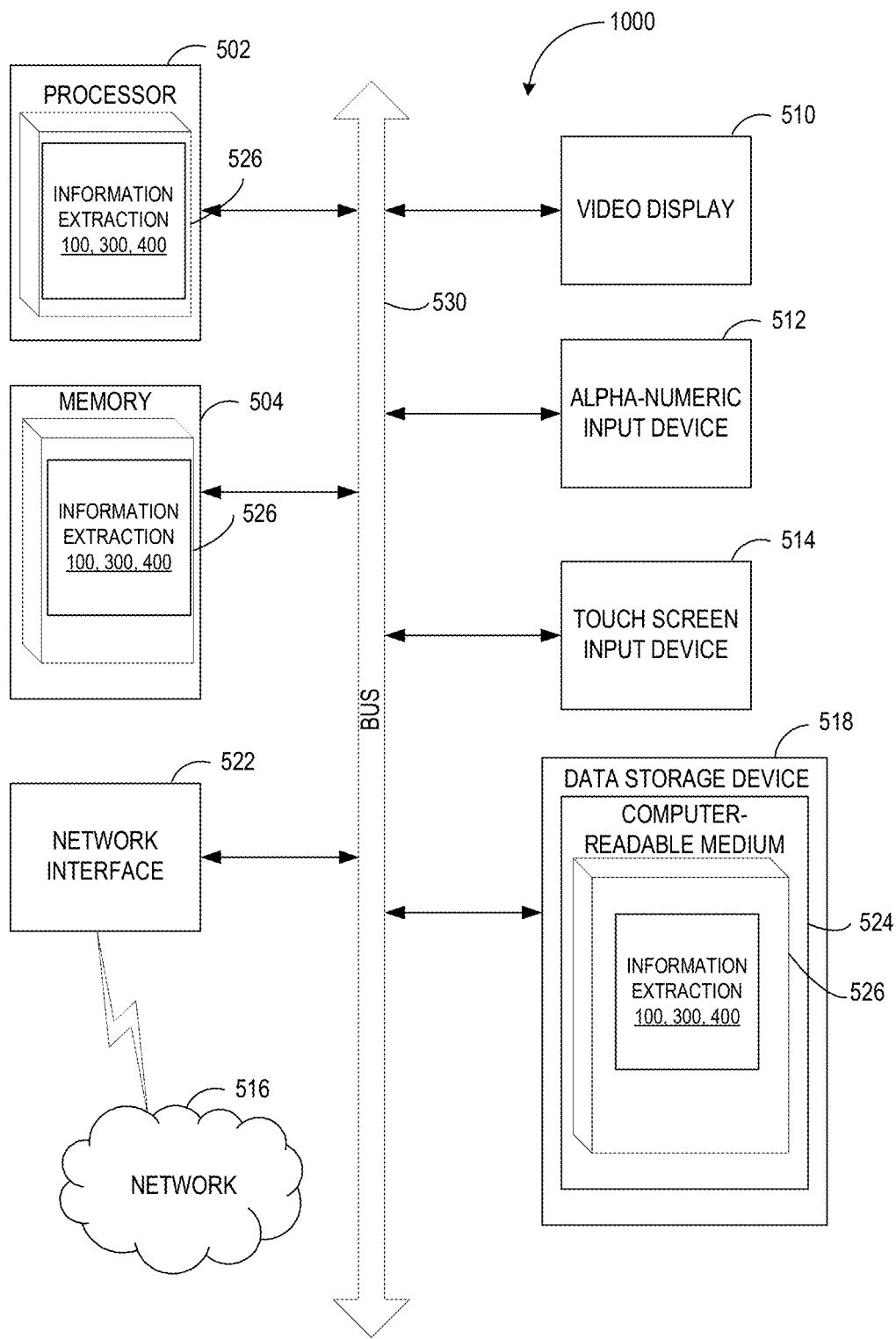
FIG. 16 depicts a diagram of an example computer system implementing the methods described herein.

FIG. 16 illustrates a diagram of an example computer system 1000 which may execute a set of instructions for causing the computer system to perform any one or more of the methods discussed herein. The computer system may be connected to other computer system in a LAN, an intranet, an extranet, or the Internet. The computer system may operate in the capacity of a server or a client computer system in client-server network environment, or as a peer computer system in a peer-to-peer (or distributed) network environment. The computer system may be a provided by a personal computer (PC), a tablet PC, a set-top box (STB), a Personal Digital Assistant (PDA), a cellular telephone, or any computer system capable of executing a set of instructions (sequential or otherwise) that specify operations to be performed by that computer system. Further, while only a single computer system is illustrated, the term "computer system" shall also be taken to include any collection of computer systems that individually or jointly execute a set (or multiple sets) of instructions to perform any one or more of the methodologies discussed herein.

Exemplary computer system 1000 includes a processor 502, a main memory 504 (e.g., read-only memory (ROM) or dynamic random access memory (DRAM)), and a data storage device 518, which communicate with each other via a bus 530.

Processor 502 may be represented by one or more general-purpose computer systems such as a microprocessor, central processing unit, or the like. More particularly, processor 502 may be a complex instruction set computing (CISC) microprocessor, reduced instruction set computing (RISC) microprocessor, very long instruction word (VLIW)

microprocessor, or a processor implementing other instruction sets or processors implementing a combination of instruction sets. Processor 502 may also be one or more special-purpose computer systems such as an application specific integrated circuit (ASIC), a field programmable gate array (FPGA), a digital signal processor (DSP), network processor, or the like. Processor 502 is configured to execute instructions 526 for performing the operations and functions discussed herein.

Computer system 1000 may further include a network interface device 522, a video display unit 510, a character input device 512 (e.g., a keyboard), and a touch screen input device 514.

Data storage device 518 may include a computer-readable storage medium 524 on which is stored one or more sets of instructions 526 embodying any one or more of the methodologies or functions described herein. Instructions 526 may also reside, completely or at least partially, within main memory 504 and/or within processor 502 during execution thereof by computer system 1000, main memory 504 and processor 502 also constituting computer-readable storage media. Instructions 526 may further be transmitted or received over network 516 via network interface device 522.

In certain implementations, instructions 526 may include instructions of methods 100, 300 and/or 400 for information extraction and classifier training, in accordance with one or more aspects of the present disclosure. While computer-readable storage medium 524 is shown in the example of FIG. 16 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "computing," "calculating," "obtaining," "identifying," "modifying" or the like, refer to the actions and processes of a computer system, or similar electronic computer system, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:

receiving, by a computer device via a template-generating graphical user interface, a first text fragment, comprising a first identifier of a first text token, wherein the first token comprises one or more words in a natural language and wherein the first token references a first information object from a first category of information objects;

deriving, by the computer device, a plurality of linguistic characteristics of the first text token, wherein the plurality of linguistic characteristics comprises at least one of grammatic, syntactic, or semantic characteristics of the first text token;

displaying, using the template-generating graphical user interface, the plurality of linguistic characteristics of the first token;

receiving, via the template-generating graphical user interface, a first input identifying template attributes from the plurality of the linguistic characteristics of the first information object;

generating a first template based at least in part on the identified template attributes;

creating a first production rule for the first template;

applying the first production rule to portions of a first natural language text matching the first template, wherein applying the first production rule comprises:

identifying portions of the first natural language text that match the first template; and responsive to identifying the portions of the first natural language text matching the first template, associating the identified portions of the first natural language text with a category of information objects; and displaying, using the template-generating graphical user interface, a second information object identified in the first natural language text using the first production rule.

2. The method of claim 1 wherein the first text fragment is a fragment of the first natural language text.

3. The method of claim 1 wherein the first text fragment is a fragment of a second natural language text.

4. The method of claim 1 wherein the first text fragment is a fragment of a semantic structure corresponding to the first natural language text.

5. The method of claim 1 further comprising revising, via the template-generating graphical user interface, the first production rule based on the second information object.

6. The method of claim 1 further comprising performing semantico-syntactic analysis of the first natural language text to produce a semantic structure corresponding to the first natural language text.

7. The method of claim 1 wherein the linguistic characteristics of the first token are selected from a group consisting of grammatic characteristics, syntactic characteristics, semantic characteristics, lexical class of the first token, semantic class of the first token, position of the semantic class of the first token in a semantic hierarchy, key words, and prefixes.

8. The method of claim 1 wherein the first input comprises identifying one or more relevant linguistic characteristics of the first token from the plurality of linguistic characteristics of the first token.

9. The method of claim 1 wherein the first input comprises generalizing one or more of linguistic characteristics of the first token from the plurality of linguistic characteristics of the first token.

10. The method of claim 1 wherein the first information object is a named entity corresponding a first category of named entities.

11. A computer system, comprising:

a memory;

a processor, coupled to the memory, the processor configured to:

receive, by a computer device via a template-generating graphical user interface, a first text fragment, comprising a first identifier of a first text token, wherein the first token comprises one or more words in a natural language and wherein the first token references a first information object from a first category of information objects;

deriving, by the computer device, a plurality of linguistic characteristics of the first text token, wherein the plurality of linguistic characteristics comprises at least one of grammatical, syntactic, or semantic characteristics of the first text token;

display, using the template-generating graphical user interface, the plurality of linguistic characteristics of the first token;

receive, via the template-generating graphical user interface, a first input identifying template attributes from the plurality of the linguistic characteristics of the first information object;

generate a first template based at least in part on the identified template attributes;

create a first production rule for the first template;

apply the first production rule to portions of a first natural language text matching the first template, wherein applying the first production rule comprises:

identifying portions of the first natural language text that match the first template; and responsive to identifying the portions of the first natural language text matching the first template, associating the identified portions of the first natural language text with a category of information objects; and display, using the template-generating graphical user interface, a second information object identified in the first natural language text using the first production rule.

12. The computer system of claim 11, further comprising revising, via the template-generating graphical user interface, the first production rule based on the second information object.

13. The computer system of claim 11, further comprising performing semantico-syntactic analysis of the first natural language text to produce a semantic structure corresponding to the first natural language text.

14. The computer system of claim 11 wherein the linguistic characteristics of the first token are selected from a group consisting of grammatic characteristics, syntactic characteristics, semantic characteristics, lexical class of the first token, semantic class of the first token, position of the semantic class of the first token in a semantic hierarchy, key words, and prefixes.

15. A computer-readable non-transitory storage medium comprising executable instructions that, when executed by a computer system, cause the computer system to:

receive, by a computer device via a template-generating graphical user interface, a first text fragment, comprising a first identifier of a first text token, wherein the first token comprises one or more words in a natural language and wherein the first token references a first information object from a first category of information objects;

deriving, by the computer device, a plurality of linguistic characteristics of the first text token, wherein the plurality of linguistic characteristics comprises at least one of grammatical, syntactic, or semantic characteristics of the first text token;

display, using a template-generating graphical user interface, a plurality of linguistic characteristics of the first token;

receive, via the template-generating graphical user interface, a first input identifying template attributes from the plurality of the linguistic characteristics of the first information object;

generate a first template based at least in part on the identified template attributes;

create a first production rule for the first template;

apply the first production rule to portions of a first natural language text matching the first template, wherein applying the first production rule comprises:

identifying portions of the first natural language text that match the first template; and responsive to identifying the portions of the first natural language text matching the first template, associating the identified portions of the first natural language text with a category of information objects; and display, using the template-generating graphical user interface, a second information object identified in the first natural language text using the first production rule.

\* \* \* \* \*